United States Patent [19]
Murakami et al.

[11] Patent Number: 5,148,016
[45] Date of Patent: Sep. 15, 1992

[54] OPTICAL COORDINATE INPUT APPARATUS AND POSITION INDICATOR THEREOF

[75] Inventors: Azuma Murakami; Norio Saito, both of Kitakatsushika, Japan

[73] Assignee: Wacom Co., Ltd., Saitama, Japan

[21] Appl. No.: 591,516

[22] Filed: Oct. 2, 1990

Related U.S. Application Data

[63] Continuation-in-part of Ser. No. 426,296, Oct. 25, 1989, abandoned.

[30] Foreign Application Priority Data

Oct. 26, 1988 [JP] Japan ................. 63-270519
May 22, 1989 [JP] Japan ................. 1-58156
Jun. 1, 1989 [JP] Japan ................. 1-139887

[51] Int. Cl.⁵ .............................................. G04V 9/04
[52] U.S. Cl. ...................................... 250/221; 340/709; 359/727
[58] Field of Search ............... 250/201.6, 221; 356/1, 356/4; 340/709, 710; 359/727, 728, 732

[56] References Cited

U.S. PATENT DOCUMENTS 2,592,329  4/1952  Picard et al. ................. 359/727
3,632,191  1/1972  Cox ............................. 359/727
4,660,929  4/1987  Sick ............................. 359/732

Primary Examiner—David C. Nelms
Assistant Examiner—Que T. Le
Attorney, Agent, or Firm—Lowe, Price, LeBlanc & Becker

[57] ABSTRACT

The position of an object including a retroreflector is determined by scanning first and second optical beams toward an axis on a planar surface from spaced sites on opposite sides of the axis. The scanned beams are incident on and reflected from the retroreflector along coincident first and second paths between the sites and the retroreflector. Indications are derived of first and second angles between a baseline between the sites and the first and second paths extending between the sites and the retroreflector. In response to the known distance between the sites and the derived indications of the first and second angles a two-coordinate direction indication of the retroreflector position is derived. The retroreflector refracts and reflects the scanned optical beams incident thereon and refracts the beams reflected thereby.

75 Claims, 21 Drawing Sheets

OPTICAL COORDINATE INPUT APPARATUS AND POSITION INDICATOR THEREOF

RELATION TO COPENDING APPLICATION

The present application is a continuation-in-part of co-pending, commonly assigned Ser. No. 07/426,296, filed Oct. 25, 1989, now abandoned.

BACKGROUND OF THE INVENTION

1. Field of the Invention

The present invention relates to an optical coordinate input apparatus and a position indicator thereof capable of inputting information about manuscripts, figures, precise drawings, and the like to a host apparatus. More particularly, the present invention relates to an optical coordinate input apparatus and a position indicator thereof which can be optionally applied to a subject two-dimensional coordinate plane and in which a region to which indications of coordinates are substantially free from restrictions.

2. Description of Prior Art

There are a variety of so-called coordinate input apparatuses capable of deriving two dimensional coordinates of an object being tracked; exemplary of the mechanisms used in these devices are electrostrictive, electromagnetic induction, pressure and electrostatic induction type. All of these apparatuses basically include a coordinate indicating portion having a tablet (or a keyboard) defining a two dimensional coordinate plane and a movable position indicating apparatus. The tablet and the position indicating apparatus are connected to each other by an electric, magnetic, or mechanical signal so that the position on the two-dimensional coordinate plane of the position indicating apparatus is detected. Thus, the input coordinates are indicated.

However, the above-described conventional coordinate input apparatuses require an exclusive tablet of a special structure having predetermined dimensions, shape, and structure in accordance with the physical mechanism used for enabling the signal transmission/receipt to and from the position indicating apparatus. Therefore, there has been a paper size limit from the viewpoint of the manufacturing technology, the largest paper size being about A0 size even if the electromagnet type apparatus, which is considered to be advantageous in accuracy and to be thereby suitable to larger sizes, is used. Furthermore, the plane region to which input of the coordinates can be provided has been necessarily limited by the area of the tablet. Therefore, input signals representing graphics drawn over an optional area cannot be freely provided regardless of whether the area is wide or narrow.

The position indicators of the above-described conventional coordinate input apparatuses have usually been combined with an exclusive tablet capable of transmitting and receiving a signal. Therefore, the conventional coordinate input apparatuses cannot solely (that is, in a manner separated from the tablet) be applied to an optional two dimensional coordinate plane. Furthermore, since the dimensions of the plane of the exclusive tablet have been physically limited, the position indicator cannot easily derive two dimensional information for a wide area.

SUMMARY OF THE INVENTION

A first object of the present invention is to provide a coordinate input apparatus which is applicable to a large two dimensional coordinate plane.

In order to achieve the first object, an optical coordinate input apparatus according to the present invention comprises: a reflection type position signaling device for deriving coordinate input data; the device is movably disposed over a two dimensional coordinate plane having a given size so that incident optical radiation passing along an optical passage which is toward a central axis of the plane is reflected, the reflected light passing inversely along the optical passage; an optical source disposed on the coordinate plane emits incident light that angularly scans along the coordinate plane from two points disposed away from each other on a reference line and capable of receiving light which inversely passes after the light has been reflected by the position indicator when the incident light coincides with the optical passage; and a calculating portion for calculating angles between the optical passages connecting the two points to a central axis of the position indicator and the reference line and further calculating the coordinate instructed by the position indicator by using thus calculated angles and a distance between the two points in accordance with a principle of triangulation.

According to the present invention, the reflection type position indicator is disposed on the two dimensional coordinate plane to derive an indication of the object coordinates. The optical source disposed on this coordinate plane emits optical beams from two spaced points on the reference line. The beams propagate toward the reflection type position indicator and are simultaneously angularly scanned. The incident beam propagating toward the central axis of the position indicator is reflected by the position indicator, causing the reflected light beam to propagate in the reverse direction. When the reflected beam propagates along the same path as the incidence beam back to the angular scanner, i.e., when the incident and reflected beams coincide, an output signal is derived. The angles between the optical paths and the reference lines are determined when the beams coincide are determined by a computer. The computer uses the thus obtained angles and the distance between the two spaced points to calculate the coordinates of the object in accordance with triangulation principles.

As described above, the coordinate input apparatus according to the present invention is arranged to be operated on the basis of the incident and emitted beams between the reflection type position indicator and the source which are respectively positioned so as to maintain a predetermined relative positional relationship with respect to the two dimensional coordinate plane. Therefore, it is not necessary for the coordinate input apparatus to include a tablet having special dimensions and shape which has been necessary for the conventional coordinate input apparatus. Therefore, the apparatus according to the present invention is free of the above-described restriction of the tablet, and can be thereby freely applied to an optional two dimensional coordinate plane. Furthermore, the input region from which position data can be obtained is free of any restrictions. Therefore, a large size coordinate-input apparatus, for example, a coordinate input apparatus having an input enable region exhibiting a size of several square meters can be easily provided. As a result, coordinate information from large sized precise full scale drawings of large objects, for example, actual dimensioned precise drawings of automobiles or large-sized machines can be precisely and immediately supplied to higher apparatuses as well as conventional small sized drawings.

A second object of the present invention is to provide a coordinate input apparatus in which the distance between two spaced points disposed of a scanning optical source on a reference line can be adjusted in accordance with the area of a coordinate input region.

To achieve the above-described second object, an optical coordinate input apparatus according to the present invention includes a pair of optical sources mounted on the coordinate plane for emitting incident beams that angularly scan along the coordinate plane from two spaced points along a reference line. The beams are reflected by the position indicator. When the incident and reflected paths coincide, signals are derived. The angular scanners are relatively moved along the reference line so that a distance between the two points are determined to correspond to the size of the coordinate plane.

According to the thus constituted coordinate input apparatus, a pair of optical source units including the angular scanners are moved relative to each other along the reference line in accordance with the area of the coordinate input region. As a result, an excellent optical coordinate input apparatus for various usages can be provided since coordinates can be determined over any optional sized coordinate input regions.

A third object of the present invention is to provide an optical coordinate input apparatus capable of reducing the intervals between detections of the coordinates.

To achieve the above-described third object, an optical source portion emits incident optical energy that is angularly scanned along the coordinate plane from two spaced points along a reference line and receives light that has been reflected by the position indicator. When the incident beam path coincides with the reflected beam path, an output signal is derived. As a result, the interval between adjacent detections of the coordinates can be reduced so that the coordinates of the object can be quickly determined.

A fourth object of the present invention is to provide an optical coordinate input apparatus capable of instructing the calculation timing of the coordinate by a user's operation.

In order to achieve the above-described fourth object, an optical coordinate input apparatus according the present invention is structured such that the position indicator is provided with a coordinate calculation instruction circuit for generating a signal for instructing calculation of the coordinates of an object. The coordinate calculation circuit calculates the coordinate in accordance with an output signal derived by a generating circuit. As a result, the time when the coordinates are derived is controlled by an operation through the position indicator.

A fifth object of the present invention is to provide a reflection type position indicator which is free from the restriction of the tablet in principle and is thereby capable of being freely applied to optional two dimensional coordinate planes, the apparatus exhibiting the coordinate input region being free from any substantial restriction.

In order to achieve the above-described fifth object, an indication of an object that moves over an XY plane includes mirrored surfaces at positions which are parallel to a two-dimensional coordinate plane, that is, plane XY. The surfaces are equidistant from a central axis and are located in a plane parallel to the plane XY. The position indicator according to this feature has an optical reflection type structure, enabling the coordinate positions in the two-dimensional coordinate plane of the object to be detected in accordance with triangulation principles. Therefore, the position indicator according to the present invention does not require a tablet so that the object can be freely applied to a two-dimensional coordinate plane. As a result, restrictions in the coordinate input region are eliminated.

A sixth object of the present invention is to provide a position indicator that selectively reflects an incident optical beam passing toward a central axis. The beam represents the position of a position indicator and returns as a reflected beam to the light source of the incident light. The position indicator continuously derives indications that enable coordinates to be derived by a computer. The position indicator (a cursor) is manually moved over the plane. The reflected beam is kept within the reflected light path that coincides with the incident beam even if the position indicator is inclined with respect to the coordinate plane during the movement.

In order to achieve the above-described sixth object, the position indicator according to the present invention has an annular lens member. The annular lens member is made of an optical material in the form of an annular shape having a concentric inner surface and an outer surface. The inner surface is formed so the cross sectional shape thereof is parallel to a concentric axis on a cross section cut by a plane including the concentric axis. The outer surface has a predetermined convex curvature to form a lens surface having its optical axis extending along the radial direction of the annular shape; the lens has its focal point on the inner surface. A reflection layer disposed on the inner surface of the annular lens member reflects optical energy which is incident along a plane including the concentric axis and the radial optical axis; the energy is reflected parallel to the incident light. As a result, the incident beams passing toward the central axis of the position indicator are selectively reflected, and the reflected light beam propagates back to the source of the incident energy. Furthermore, when the position indicator is continuously and manually moved over the plane for continuously deriving the coordinates. If the position indicator is inclined with respect to the coordinate plane during movement, the reflected optical beam is kept within an optical passage through which the incident beams propagate.

Other and further objects and features of the invention will appear more fully from the following description.

DETAILED DESCRIPTION OF THE PREFERRED EMBODIMENTS

Figure 1A:
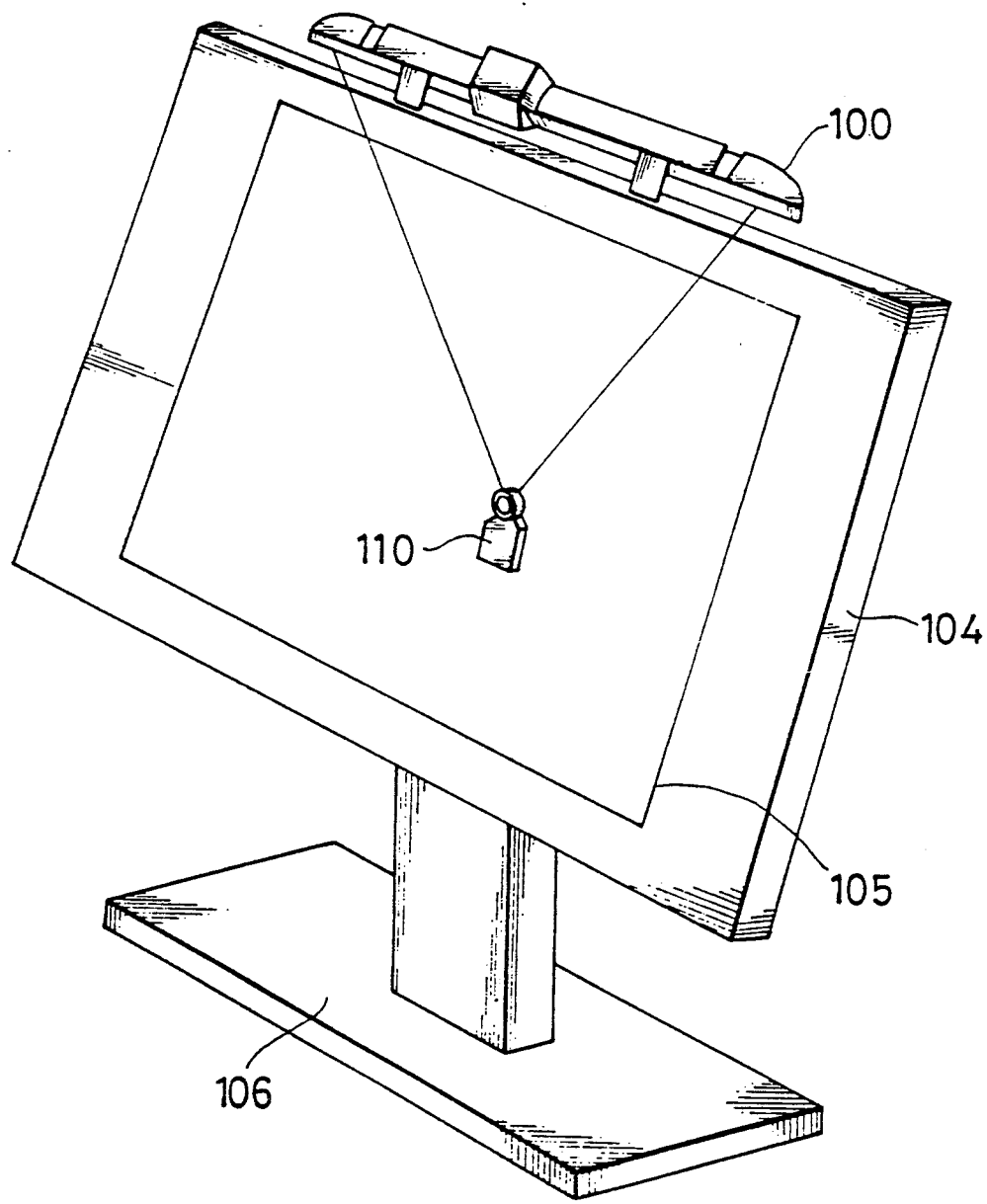
FIG. 1(a) is a perspective view of a coordinate input apparatus which employs the optical recursively-reflecting type coordinate input cursor.
Figure 1B:
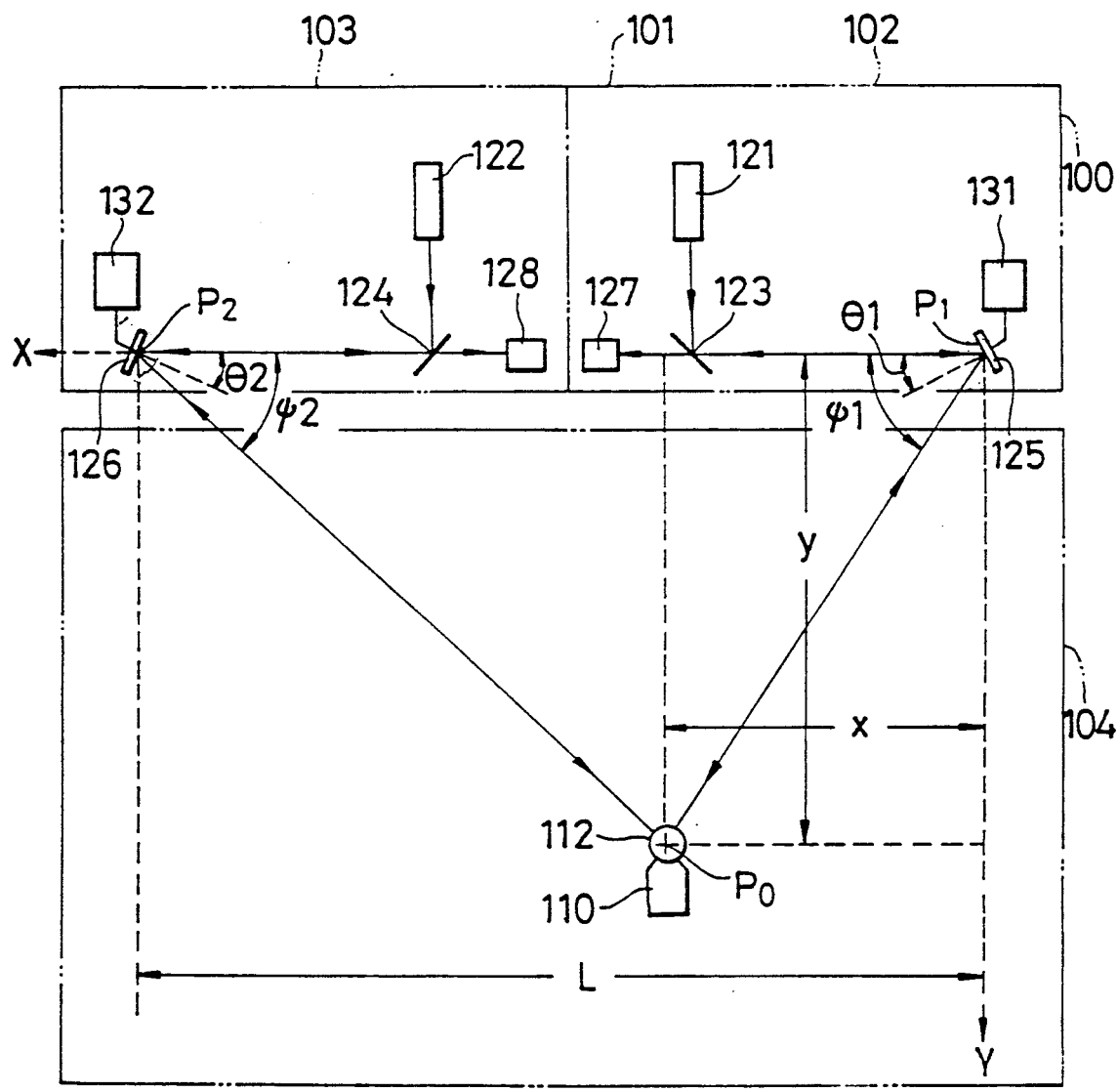
FIG. 1(b) is a schematic drawing of an optical system for use in a first embodiment.

FIG. 1(a) is a perspective view of the two-dimensional coordinate input apparatus. FIG. 1(b) is an optical schematic of the elements constituting the optical system of FIG. 1(a).

The apparatus of FIG. 1(a) includes optical circuit accommodating portion 100 and input board 104. The XY coordinates of optical recursively-reflecting type coordinate input cursor or position indicator 110 can be determined over rectangular area 105.

As illustrated in FIG. 1(b), laser light sources 121 and 122 respectively illuminate semi-transparent mirrors 123 and 124. The beams reflected from mirrors 123 and 124 are respectively incident on first and second rotary mirror 125 and 126, respectively driven by drives 131 and 132, while beams reflected from retroreflecting cursor 110 are respectively reflected from mirrors 125 and 126 to first and second photodetectors 127 and 128, after passing through semi-transparent mirrors 123 and 124. In the embodiment of FIG. 1(a), the area of input board 104 is relatively small. Therefore, a structure for supporting input board 104 is employed. However, the present invention is not limited to the above-described coordinate input apparatus. For example, an input board having a relatively large area may be horizontally disposed on a floor or a supporting frame in the case where the exact size of the contour of an automobile or the like is to be determined.

Each of the laser light sources 121 and 122 comprises a semiconductor laser so that the laser beam emitted from the laser light source 121 is parallel to the plane XY. The beam from source 121 propagates to semi-transparent mirror 124, (on axis X) thence is incident on the rotational axis of first rotary mirror 125 (on axis X), disposed at origin point P1 of the plane XY. The laser beam emitted from the laser light source 122 propagates via semi-transparent mirror 124 (on axis X) so it is incident on the rotational axis of the second rotary mirror 126 disposed at point P2 (on axis X), spaced from rotary mirror 125 by the predetermined distance L, which is, for example, 5 m. The laser beams incident on mirrors 125 and 126 are parallel to the plane XY. Each of the first and second photosensors 127 and 128 is, for example, a silicon photodiode. The first photosensor 127 is disposed so that it detects the laser beam emitted from laser light source 121 and reflected by first rotary mirror 125 in the same direction as the light incident on the first rotary mirror 125, after the reflected beam has propagated through semi-transparent mirror 123. The second photosensor 128 is disposed so that it detects the laser beam emitted from laser light source 122 and reflected by second rotary mirror 126 in the same direction as the light incident on the second rotary mirror 126, after the reflected beam has propagated through semi-transparent mirror 124.

Figure 2:
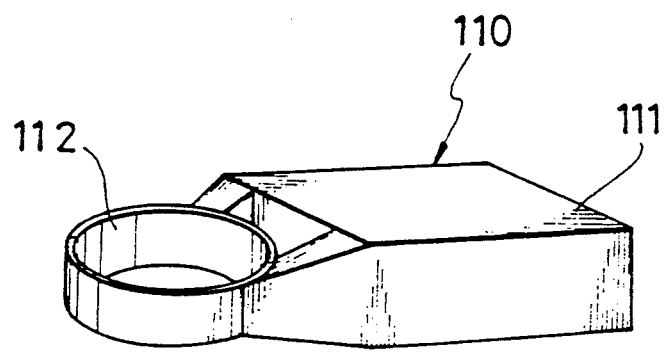
FIG. 2 is a perspective view of a position indicator for use in the first embodiment.

As shown in FIG. 2, one embodiment of position indicator 110 is constituted in such a manner that a cylindrical mirror portion 112 is disposed on one side surface of a box-like main body 111, the bottom portion of the main body 111 and the same of the mirror portion 112 being arranged such that they can be held parallel to a two-dimensional coordinate plane, that is, plane XY. A mirror formed on the outer surface of the mirror portion 112 is arranged to be perpendicular to the bottom surface of the mirror portion 112. A transparent display plate (not shown) made of synthetic resin is attached to the above-described bottom surface of the mirror portion 112. A hair-cross mark indicating the center of the mirror portion 112 is written on the above-described display plate. Thus, the coordinate input position can be instructed by moving the position indicator 110 over the above-described plane XY.

Figure 16:
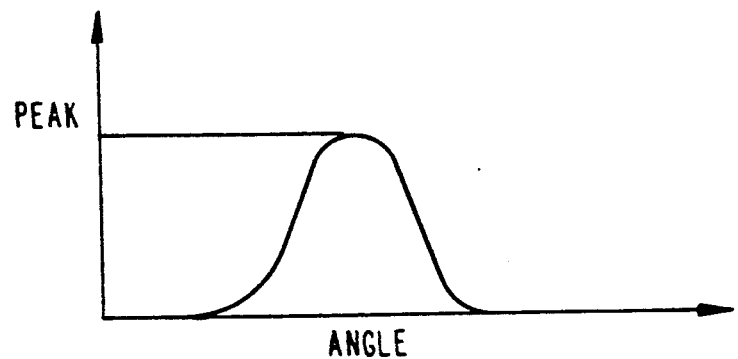
FIG. 16 is a graph of the luminous intensity distribution of the laser beam reflected by the cursor.

FIG. 16 is a graph of the luminous intensity distribution of the recursively reflected laser beam received and detected at point light source P1, wherein the scanning angle of the incidental laser beam can be read from the abscissa axis. As is shown from the graph, the luminous intensity of the reflected laser beam increases when the laser beam crosses the recursively reflecting layer 4 on the cylindrical surface of the cursor until the incident-/reflected optical path coincides with a straight line drawn between the central point P0 of the cursor and the light source P1. At this time, the incidental laser beam is perpendicularly incident on the recursively reflecting layer 4. Therefore, the recursively reflecting efficiency reaches its maximum value and the scanning angle $\phi1$ can be determined on the basis of the point at which the luminous intensity of the reflected laser beam has a maximum value. The receipt of the reflected laser beam is stopped when the reflected laser beam crosses the recursively reflecting layer 4 on the cylindrical surface of the cursor.

Figure 17:
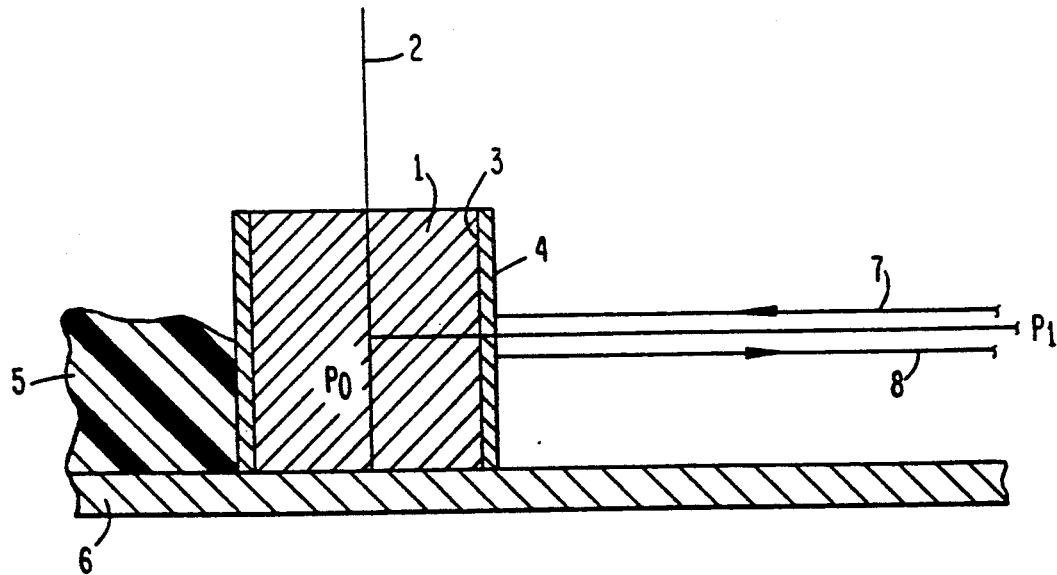
FIG. 17 is a cross sectional view of the cursor that can be used with any of FIGS. 1(b), 5, 10, 13(a) or 15(a)

FIG. 17 is a cross sectional view of another embodiment of the cursor 110 shown in FIG. 1(a) and taken along a line drawn between central point P0 of collimating member 1 and light source P1. As clearly seen from FIG. 17, supporting member 5 has a bottom portion which slides on the top planar surface of coordinate plate 6 and a fastening portion for securing and holding the non-effective portion of the outer surface of the collimating member 1 in such a manner that the cylinder axis 2 of the collimating member 1 is positioned perpendicularly to the top surface of plate 6. A laser beam 7, which traverses the optical path connecting the central point P0 of the cursor and point light source P1, is recursively reflected by the recursively reflecting layer 4 so that is reversely passed through the same optical path toward the original light source P1. The recursively reflecting layer 4 directionally reflects at least a portion of the incident light beams so as to reversely pass them through the same optical path regardless of the incident angle. Therefore, the recursively reflected beam 8 always travels back from the cursor toward light source P1 even if the cylinder axis 2 is tilted and the incident angle of the laser beam on recursively reflecting layer 4 is thereby changed due to shaking of support member 5 relative to plate 6 or undulation of the plate. In general, the reflecting efficiency of the recursively reflecting layer 4 depends on the incident angle (see FIG. 16) of the optical energy from source P1 or P2 on the reflecting layer. Therefore, at least a portion of the light is recursively reflected.

Figure 18:
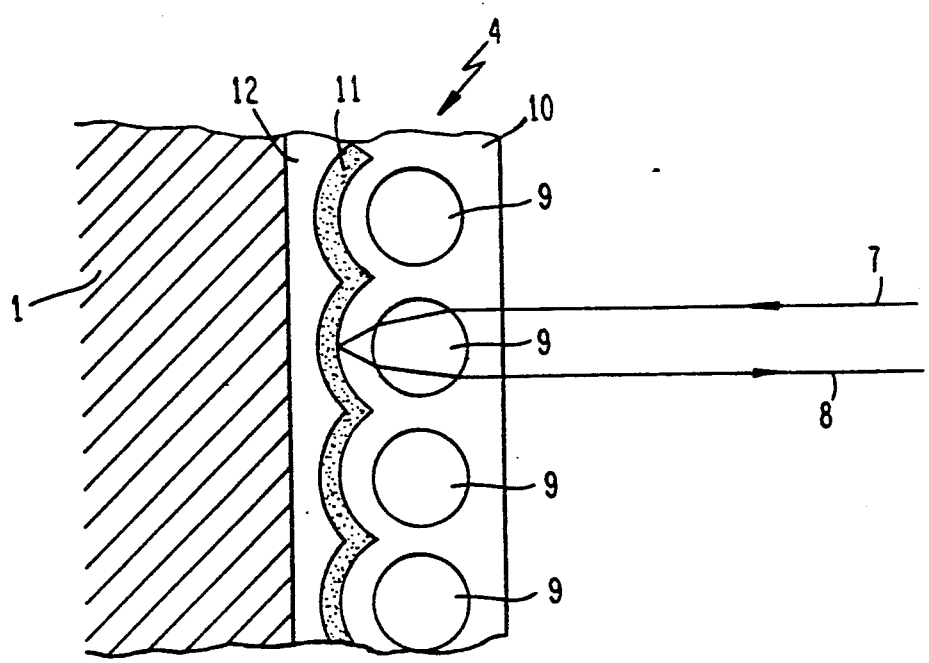
FIG. 18 is an enlarged cross sectional view of an exemplary recursive reflecting layer.

FIG. 18 is an enlarged partial view of the recursively reflecting layer 4 shown in FIG. 17. Recursively reflecting layer 4 includes multiple recursive elements, each of which exhibits the optical recursively reflecting effect. In the embodiment of FIG. 18, the recursive element comprises a very large number (for certain purposes, an infinite number) of optical refractive small globular bodies 9 dispersively disposed at a high density on the cylindrical surface of the cursor. The small globular bodies 9 are made of, for example, glass beads each having a diameter of several tens of microns and a refractive index between 2.20 and 2.22. According to this embodiment, the recursively reflecting layer 4 has a multi-layer form including a transparent resin surface layer 10 in which the small globular bodies 9 are dispersively supported, a light reflecting layer 11 formed on the reverse side of the surface layer 10 and an adhesive layer 12 for adhering the light reflecting layer 11 to the cylindrical surface of the cursor. The optical reflecting layer 11 can be formed by metallizing aluminum or the like onto resin layer 10. In order to improve the recursively reflecting efficiency, the small globular bodies 9 may be regularly arranged at a high density in the transparent resin layer 10.

As shown in FIG. 18, an incident light beam 7, which is individually incident upon each of the optical refractive small globular bodies 9, is refracted by a significant amount in globular body 9 so that it converges on light reflecting layer 11. The convergent light beam is reflected by the light reflecting layer 11 before it is again significantly refracted in the globular body 9 so that it is converted into a parallel beam 8 which then propagates away from the globular body 9. That is, since globular bodies 9 respectively have the recursively reflecting function, the entire cylindrical surface of reflecting layer 4 exhibits the recursive effect.

Figure 19:
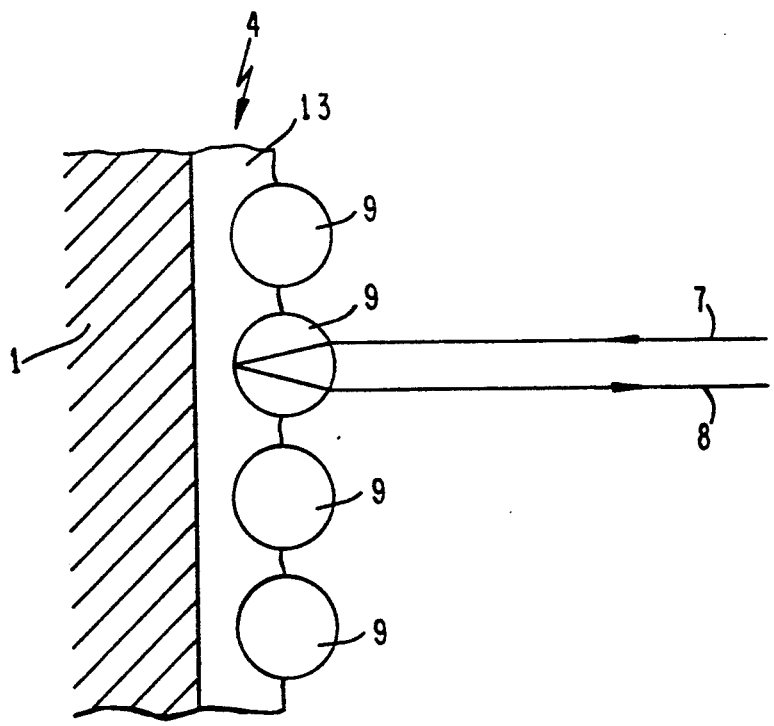
FIG. 19 is an enlarged cross sectional view of another example of the recursive reflecting layer.

FIG. 19 is an enlarged partial cross sectional view of a modification to the recursively reflecting layer. According to this modification, recursively reflecting layer 4 is formed by a coating film 13 coated on the outer diameter of a cylinder; optical refractive small globular bodies 9 are dispersively disposed in the film. The small globular bodies 9 are made, for example, of glass beads having a diameter of several hundreds of microns and a refractive index from 1.90 to 1.93. The recursively reflecting layer 4 is formed by directly applying liquid, in which the above-described glass beads are dispersed, to the cylindrical surface of the collimating member 1 before the applied liquid has dried.

As shown in FIG. 19, incident light beam 7, which is individually incident on each of the optical refractive small globular bodies 9, is significantly refracted in each globular body 9 so that it converges on the spherical surface in the rear portion of the globular body. Therefore, the reflected light beam 8 is highly directional as it reversely travels toward the source of incident light beam 7.

Figure 20:
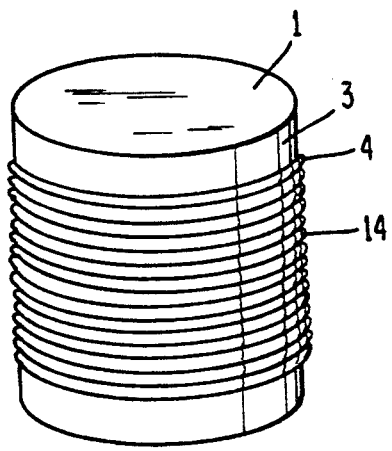
FIG. 20 is a perspective view of another embodiment of the optical recursive reflecting coordinate cursor that can be used with any of FIGS. 1(b), 5, 10, 13(a) or 15(a)

FIG. 20 is a perspective view of another embodiment of optical recursively-reflecting type coordinate input cursor 110. According to this embodiment, the recursively reflecting layer 4 formed on cylindrical surface 3 of collimating member 1 includes a linear optical member 14, i.e., an optical fiber, wound circumferentially around cylindrical surface 3. The linear optical member has, for example, a circular cross sectional shape and is made of a glass fiber having a high refractivity.

Figure 21:
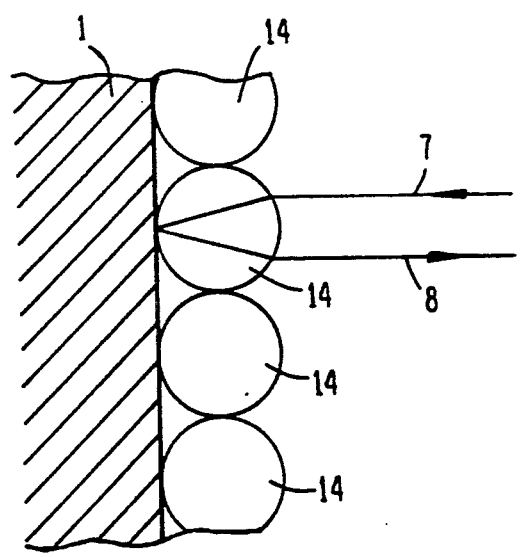
FIG. 21 is an enlarged cross sectional view of the recursive reflecting layer of the cursor shown in FIG. 20.

FIG. 21 is an enlarged partial cross sectional view of the recursively reflecting layer 4 shown in FIG. 20. As shown in FIG. 21, light beam 7, which is incident on each of linear members 14 having a circular cross sectional shape, is significantly refracted so that it converges on the side surface of the rear portion of the linear member 14. The converged light beam is reflected from the rear portion; and the reflected beam is again refracted as it propagates through member 14 so that it propagates from member 14 as parallel beam 8.

The operation of the cursor according to the present invention is now described with reference to FIG. 1(b). First, the supporting member 5 for supporting cursor 110 is held on a predetermined plane XY and the central point P0 of the cursor is, by using cross hairs, made to coincide with a predetermined specific point having coordinates to be determined.

Then, with the central point P0 of the cursor coincident with the point having coordinates to be determined, light beams for angularly scanning the coordinate plane are emitted from light sources P1 and P2, spaced from each other by the predetermined distance L. When the light beams emitted from the light source P1 crosses the recursively reflecting layer 4 in the circumferential direction, the incident light beam is recursively reflected by the recursively reflecting layer 4. As a result, the reflected light beam reversely travels the same optical path as that for the incident light beam until it reaches the light source P1 where it is received and detected. Angle $\phi1$ between (a) the incident/reflected optical path from the central point P0 of the cursor and the light source P1 and (b) reference line L between light sources P1 and P2 is determined in accordance with the peak position of the luminous intensity of the reflected light beam. As for the other light source P2, there is a determination of angle $\phi 2$ between (a) the optical path when the incident/reflected light beam coincides (in a plan view) with the line drawn from the central point P0 of the cursor and the light source P2 and (b) the above-described reference line. In accordance with the angular values of $\phi 1$ and $\phi 2$ thus obtained and the known distance L between light sources P1 and P2, the coordinates of the cursor central point P0 can be obtained in accordance with triangulation principles.

Figure 3:
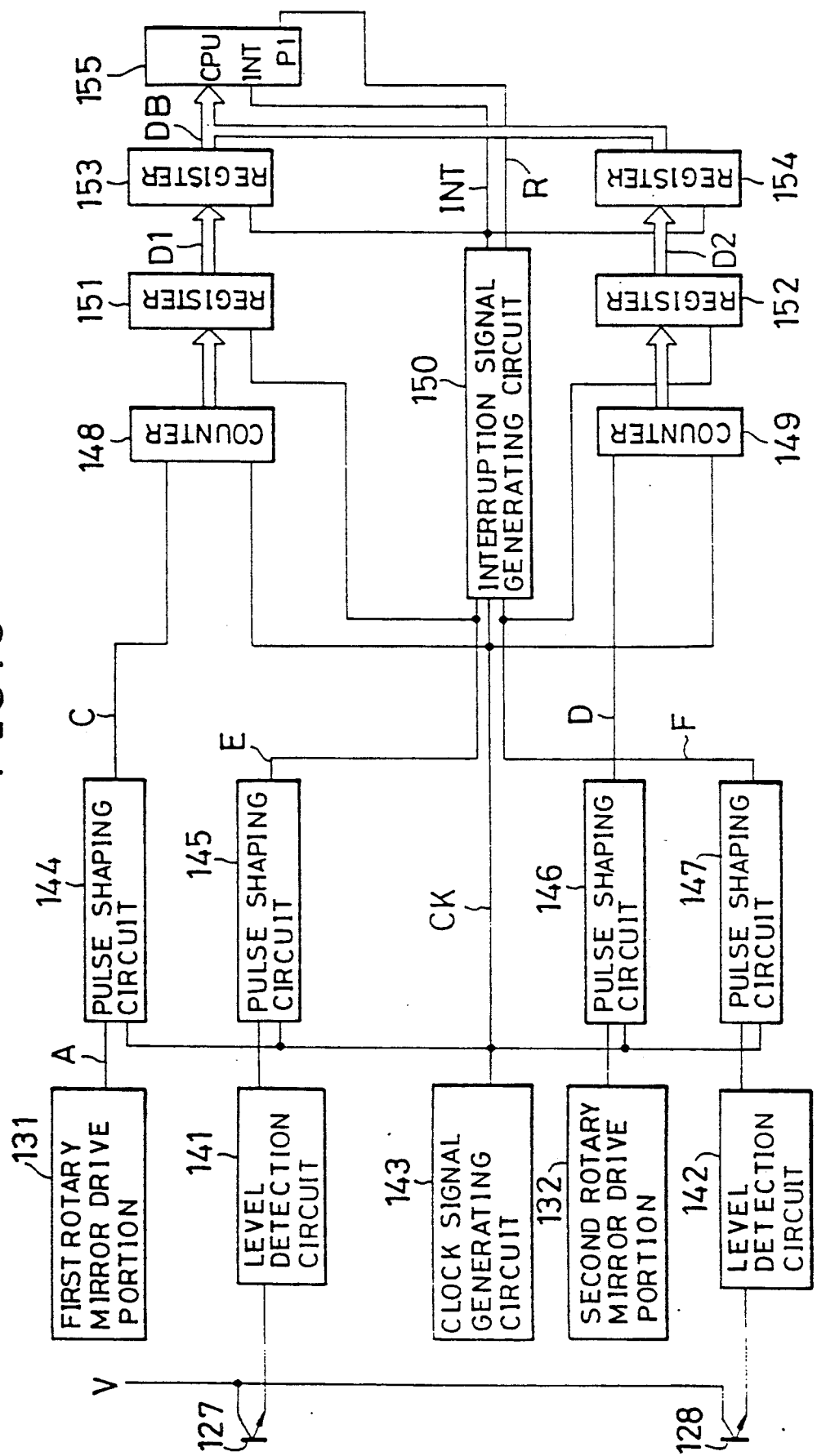
FIG. 3 is a block diagram for an electric circuit of the same.

FIG. 3 is a block diagram of an electric circuit for the two-dimensional coordinate input apparatus used with the optical system of FIG. 2. Referring to the drawing, a first-rotary mirror drive 131 counterclockwise rotates the first rotary mirror 125 shown in FIG. 1(b) at a predetermined angular velocity $\omega$. The first-rotary mirror drive 131 derives a logical "1" pulse signal A having a predetermined pulse width TPW when the normal line of the surface of the first rotary mirror 125 is the same as the path of incident light beam emitted from laser 121. The width TPW of pulse signal A is shorter than the time Tf required for first rotary mirror 125 to complete one rotation cycle. Second-rotary mirror drive 132 rotates second rotary mirror 126 shown in FIG. 1(b) clockwise at the uniform angular velocity $\omega$. The second rotary mirror drive 132 derives a logical "1" pulse signal B having the predetermined pulse width TPW when the normal line of the surface of the second rotary mirror 126 is the same as the path of the incident light beam emitted from laser 122. The width TPW of pulse signal B is shorter than the time Tf required for second rotary mirror 126 to complete one rotation cycle.

Peak detection circuits 141 and 142, each including similar resistors and operation amplifiers, respectively convert the photoelectric currents derived from first photosensors 127 and 128 into voltages. Logic "1" signals are derived from detectors 141 and 142 when each of the thus-converted voltages reaches a predetermined reference level, associated with approximately the peak current of and peak optical intensity incident on photosensors 127 and 128.

Clock signal generating circuit 143 derives a clock signal CK of predetermined period Tck. The circuit of FIG. 3 incldes pulse shaping circuits 144–147, each including a flip-flop and a logic circuit for deriving a pulse signal having the width of one clock pulse when it detects a transition of an input signal from logic "0" to logic "1." Pulse shaping circuit 144 responds to output signal A of first rotary mirror drive 131 and clock signal CK to derive signal C.

Pulse shaping circuit 145 responds to output signal of the peak detection circuit 141 and clock signal CK to derive signal E. Pulse shaping circuit 146 responds to output signal B of second rotary mirror drive 132 and clock signal CK to derive signal D. Pulse shaping circuit 147 responds to the output signal of peak detection circuit 142 and clock signal CK to derive signal F.

Each of counters 148 and 149 counts freely in response to clock signal CK. Counters 148 and 149 are respectively reset by pulse signals C and D derived from pulse shaping circuits 144 and 145.

Interruption signal generating circuit 150 includes a flip-flop and a logic circuit responsive to output signals E and F of pulse shaping circuits 145 and 147 and clock signal CK. Interruption signal generating circuit 150 supplies a logical "1" interruption signal INT to CPU 155, described later, if one of (a) pulse signals E or F is supplied to circuit 150 and then the other pulse signal E or F is supplied to the circuit or (b) both pulse signals E and F are simultaneously supplied to the circuit. In addition, the interruption signal generating circuit 150 causes the interruption signal INT to be a logic "0" if circuit 150 is supplied with a logic "1" pulse reset signal R by CPU 155.

Register 151 is connected to respond to the output of counter 148 to latch output data from counter 148 in response to the leading edge of pulse signal E derived from pulse shaping circuit 145. Register 152 is connected to respond to the output of counter 149 to latch output data from counter 149 in response to the leading edge of pulse signal F derived from pulse shaping circuit 146. An input of tri-state register 153 is connected to the output of register 151 to latch output data from register 151 in response to a transition of interruption signal INT from logic "0" to logic "1." The input of tri-state register 154 is connected to the output of register 152 to latch output data from register 152 in response to a transition of interruption signal INT from logic "0" to logic "1."

CPU 155, connected to the outputs of registers 153 and 154 via data bus DB, responds to data stored in registers 153 and 154 when interruption signal INT has a logic "1" value. CPU 155 supplies a logic "1" reset pulse signal R to output port P1 after the above-described data have been received.

A laser beam angle detection means includes first and second rotary mirror drives 131 and 132, clock signal generating circuit 143, pulse shaping circuits 144 and 146, and counters 148 and 149. An arithmetic means for determining the cursor coordinates includes detection circuits 141 and 142, clock signal generating circuit 143, pulse shaping circuits 145 and 147, interruption signal generating circuit 150, registers 151 to 154, CPU 155, and a program (to be described later) for operating the CPU 155.

Figure 4:
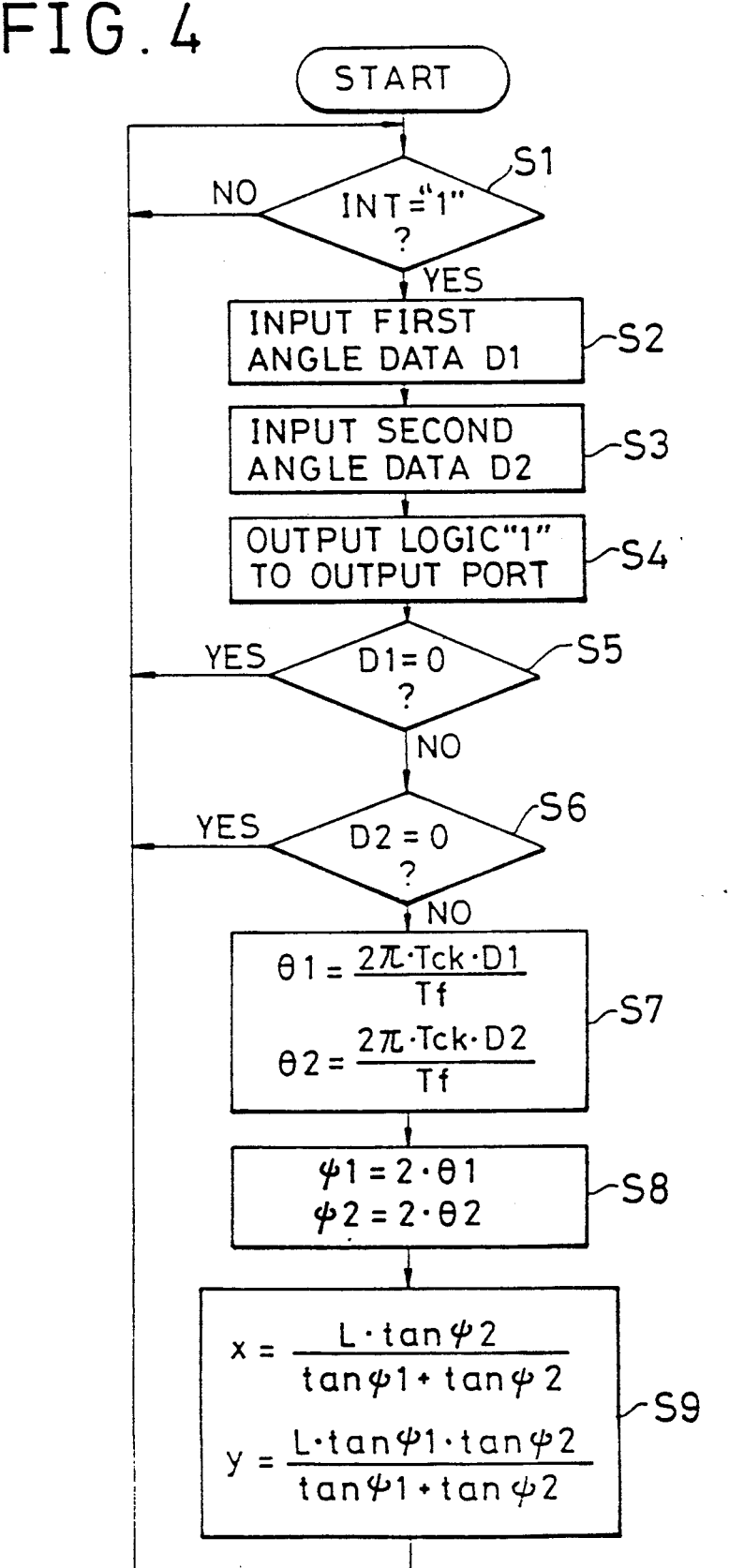
FIG. 4 is a program chart for controlling the operation of the electric circuit shown in FIG. 3.

The operation of the two-dimensional coordinate input determining apparatus is described with reference to the program in the flow chart of FIG. 4.

The description of FIG. 1(b) is for the situation where coordinates of point P on plane XY, shown in FIG. 1(b), are determined by cursor, i.e., position indicator, 110. Position indicator 110 is moved over plane XY so the intersection P0 of the hair-cross lines coincides with point P.

When the laser beam emitted from laser 121 is incident on the first rotary mirror 125 at incident angle $\theta 1$ via semi-transparent mirror 123, the reflected light from the first rotary mirror 125 propagates toward cylindrical axis of position indicator or cursor 110. The laser beam reflected by the recursively reflecting layer of cursor 110 propagates back to first photosensor 127 via first rotary mirror 125 and semitransparent mirror 123. At this time, the photoelectric current derived from first photosensor 127 reaches its peak to cause the output signal to peak detection circuit 141 to change state from a logic "0" to a logic "1." As a result, pulse signal E is derived from pulse shaping circuit 145. When the laser beam emitted from laser 122 is incident on the second rotary mirror 126 at incident angle $\theta 2$ via semitransparent mirror 124, the reflected light beam travels toward the cylindrical axis of cursor 110. The laser beam reflected by the recursively reflecting layer of cursor 110 propagates back to second photosensor 128 via second rotary mirror 126 and semi-transparent mirror 124. At this time, the photoelectric current derived from the second photosensor 128 reaches its peak to cause the output signal of peak detection circuit 142 to change state from a logic "0" to logic "1." As a result, pulse signal F is derived from pulse shaping circuit 147.

Output data from counter 148 are latched in register 151 by the pulse signal E to be stored therein as angular data D1 representing the incident angle $\theta1$ of the optical energy on first rotary mirror 125. On the other hand, output data from the counter 149 are latched in register 152 by pulse signal F to be stored therein as angular data D2 representing the incident angle $\theta2$ of the optical energy on second rotary mirror 126. Angular data D1 and D2 are latched in registers 153 and 154 by interruption signal INT.

CPU 155 always supervises whether or not interruption signal INT is a binary one, i.e., logic one, during step S1 (hereafter the term "step" is omitted when referring to the operations of CPU 155). In response to interruption signal INT becoming a logic 1 CPU 155 responds to angular data $D_1$ derived from register 153 via data bus DB (S2) and responds to angular data $D_2$ derived from register 154 (S3). Then CPU 155 supplies a logic 1 level to output board $P_1$ for predetermined time period (S4), and determines whether or not angular data $D_1$ has a binary 1 value (S5). If CPU 155 determines that the value of angular data $D_1$ is a binary zero level the program returns to S1. If, however, CPU 155 determines that the angular data has a binary 1 value, CPU 155 determines whether or not the value of angular data $D_2$ is a binary zero (S6). If CPU 155 determines that the value of angular data $D_2$ is a binary zero, the program operation returns to S1. If, however, CPU 155 determines that the value of angular data $D_2$ is a binary 1, the values of the incident angles $\theta_1$ and $\theta_2$ of the laser beams incident on first and second rotary mirrors 125 and 126, respectively, are calculated in response to the determined values of angular data $D_1$ and $D_2$ during S7 from:

$$\theta1 = 2\pi \cdot Tck \cdot D1/Tf \text{ (radian)} \qquad (1)$$

$$\theta1 = 2\pi \cdot Tck \cdot D2/Tf \text{ (radian)} \qquad (2)$$

where $T_{ck}$ is the period of clock signal CK, Tf is the time required for rotary mirrors 125 and 126 to complete one rotation cycle.

The values of Tck and Tf are previously stored in the memory of CPU 155.

Then angles $\phi_1$ and $\phi_2$ between the incident optical energy and the reflected optical energy on mirrors 125 and 126 are derived by doubling the values of the incident angles $\theta_1$ and $\theta_2$ during S8 to derive:

$$\phi1 = 2 \cdot \theta1 \qquad (3)$$

$$\phi2 = 2 \cdot \theta2 \qquad (4)$$

Then the x and y coordinates of point P are obtained using triangulation principles during step S9, in accordance with the following equations:

$$x = L \cdot \tan\theta2 / (\tan\theta1 + \tan\theta2) \qquad (5)$$

$$y = L \cdot \tan\theta1 \cdot \tan\theta2 / (\tan\phi1 + \tan\phi2) \qquad (6)$$

where L is the distance between mirrors 125 and 126, a value that has previously been stored in the memory of CPU 155.

After the x and y coordinates have been calculated the program returns to S1.

According to this embodiment the cursor is positioned on an input board having a finite area, as shown in FIG. 1(a). However, if the cursor is positioned in a region where the laser beams reflected from mirrors 125 and 126 are not incident on the cursor, the cursor can be positioned in an optional level plane or vertical plane. Such a system is illustrated in FIG. 1(b) as including rotary mirrors and semi-transparent mirrors. However, the present invention is not limited to this particular arrangement and a variety of modifications are possible, as disclosed, for example, in Japanese Patent Application 63-270519, in accordance with the present invention.

Although two lasers capable of emitting laser beams are used in this embodiment, a structure may be employed as an alternative to this in which one laser is used, the laser beam emitted therefrom being arranged to be incident on the first and second rotary mirrors 125 and 126 by using a half mirror and a full sized mirror.

According to the embodiment of FIGS. 1(a) and 1(b), although rotary mirrors each of which has a mirrored surface are employed as the first and second rotary mirrors 125 and 126, rotary mirrors each of which has a plurality of mirror surfaces may be employed. In this case, more accurate coordinates can be obtained since the intervals of the detections of the coordinates can be reduced by conducting calculations arranged to correspond to the polygon mirrors.

A further embodiment of the present invention will now be described.

Figure 5:
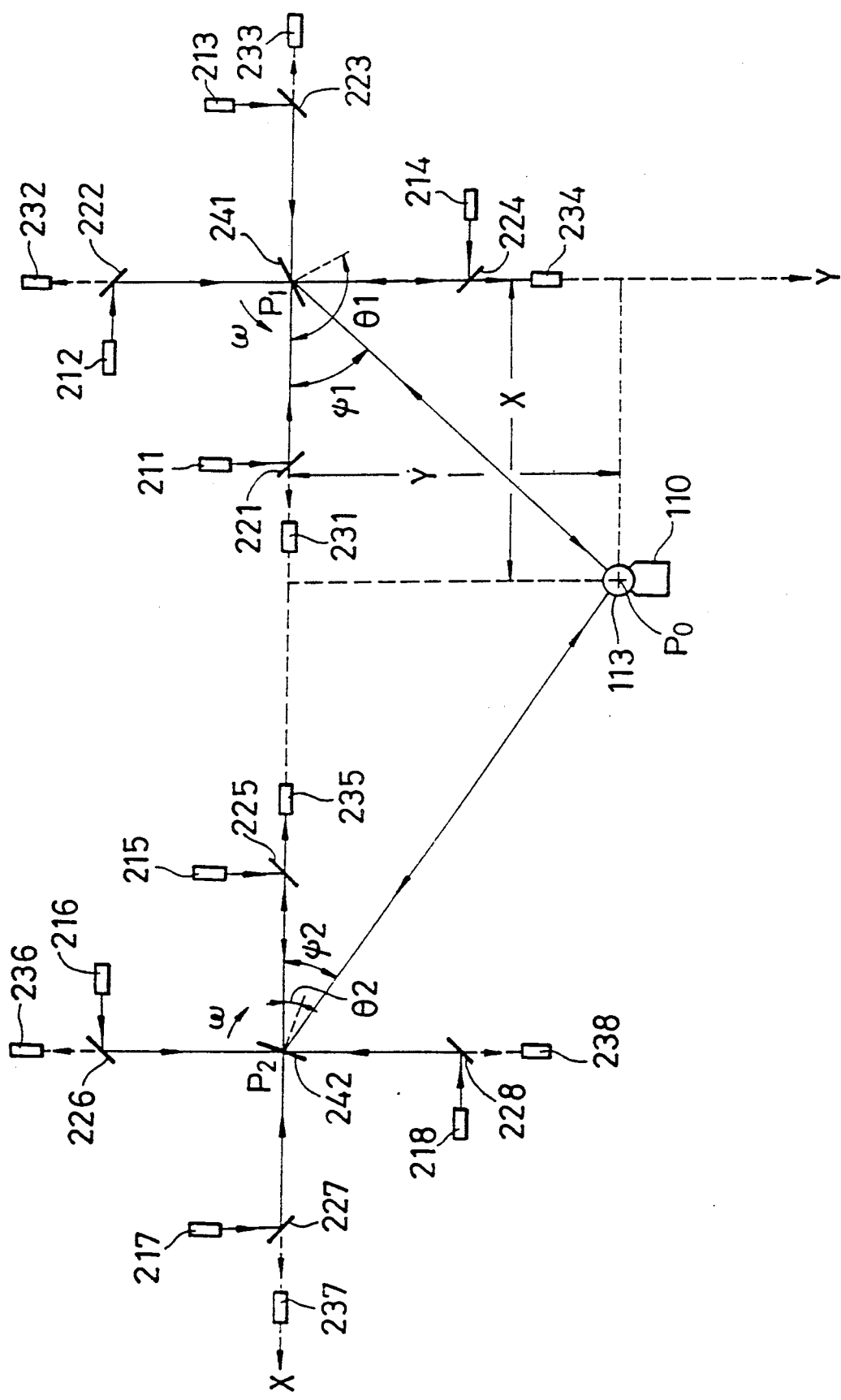
FIG. 5 is a schematic drawing of an optical system for use in the second embodiment.

FIG. 5 is a view which illustrates the arrangement of an optical system for use in the second embodiment. Referring to the drawing, reference numeral 110 represents a position indicator, 211 to 218 represent lasers, 221 to 228 represent half mirrors, 231 to 238 represent photosensors each of which comprises NPN-phototransistors whose collectors are connected to a D.C. power source. Reference numerals 241 and 242 represent first and second rotary mirrors each of which has a mirror surface.

Figure 6A:
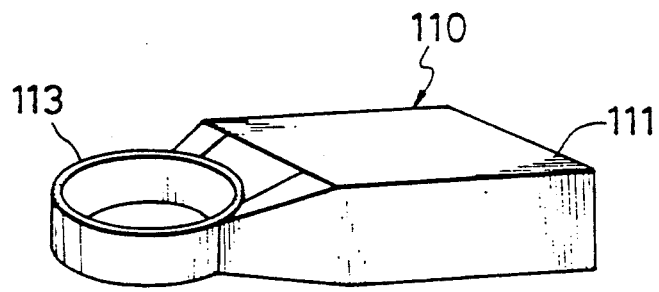
FIG. 6(a) is a perspective view of the position indicator according to the second embodiment.
Figure 6B:
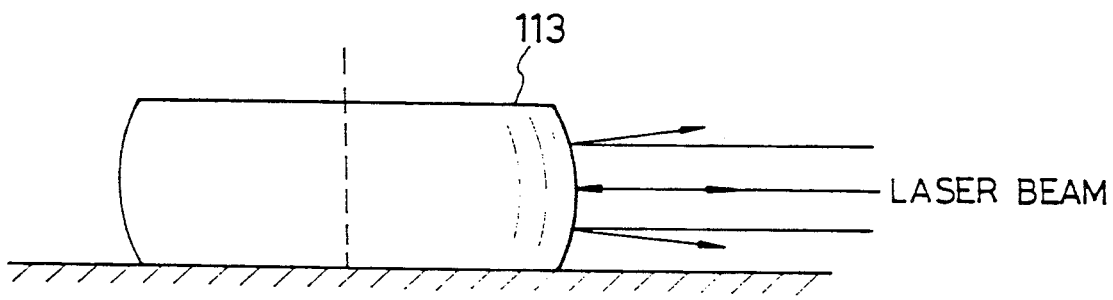
FIG. 6(b) and 6(c) are views of a mirror portion of the position indicator.
Figure 6C:
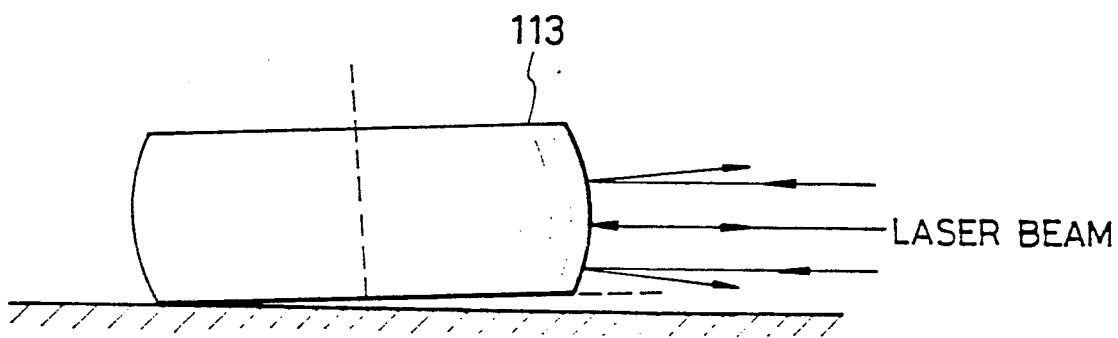

As shown in FIG. 6(a), the position indicator is constituted in such a manner that a mirror portion 113 is formed on one side surface of a box-like main body 111. The bottom surface of the main body 111 and the same of the mirror portion 113 are arranged to be capable of being retained in parallel to the plane XY. A display plate (omitted from illustration) made of transparent synthetic resin is attached to the bottom surface of the mirror portion 113, in which a hair cross mark showing the center of the mirror portion 113 is written. As shown in FIGS. 6(b) and 6(c), the side external mirror of the mirror portion 113 is outward curved at the central portion thereof. As a result, even if the laser beam incident upon the mirror portion 113 is not perpendicular to the center axis of the hair cross mark, a portion of the laser beams passing through the center axis of the hair cross mark can be reflected into same light passage.

The first rotary mirror 241 is designed such that the rotational axis thereof is positioned at the origin of the plane XY and is perpendicular to this XY plane. The second rotary mirror 242 is positioned on the X-axis and away from the first rotary mirror 241 by a predetermined distance L, for example 5 m, the rotational second rotary mirror 242 having its rotational axis perpendicular to the XY plane. The half mirror 221 is disposed on the X-axis between the first rotary mirror 241 and the second rotary mirror 242 so as to reflect the laser beam from the laser 211 and to cause it to be made incident upon the first rotary mirror 241 in parallel to the XY plane. The half mirror 222 is disposed at a position which is clockwise turned by 90 degrees from the position of the half mirror 221 relative to the rotational axis of the first rotary mirror 241 so as reflect the laser beam from the laser 212 and to cause it to be made incident upon the first rotary mirror 241 in parallel to the XY plane. The half mirror 223 is disposed at a position which is clockwise turned by 180 degrees from the position of the half mirror 221 relative to the rotational axis of the first rotary mirror 241 so as reflect the laser beam from the laser 213 and to cause it to be made incident upon the first rotary mirror 241 in parallel to the XY plane. The half mirror 224 is disposed at a position which is clockwise turned by 270 degrees from the position of the half mirror 221 relative to the rotational axis of the first rotary mirror 241 so as reflect the laser beam from the laser 214 and to cause it to be incident on the first rotary mirror 241 in parallel to the XY plane. The half mirror 225 is disposed on the X-axis between the half mirror 221 and the second rotary mirror 242 so as to reflect the laser beam from the laser 215 and to cause it to be incident on the second rotary mirror 242 in parallel to the XY plane. The half mirror 226 disposed at a position which is counterclockwise turned by 90 degrees from the position of the half mirror 225 relative to the rotational axis of the second rotary mirror 242 so as reflect the laser beam from the laser 216 and to cause it to be made incident upon the second rotary mirror 242 in parallel to the XY plane. The half mirror 227 is disposed at a position which is counterclockwise turned by 180 degrees from the position of the half mirror 225 relative to the rotational axis of the second rotary mirror 242 so as reflect the laser beam from the light source 217 and to cause it to be made incident upon the second rotary mirror 242 in parallel to the XY plane. The half mirror 228 is disposed at a position which is counterclockwise turned by 270 degrees from the position of the half mirror 225 relative to the rotational axis of the second rotary mirror 242 so as reflect the laser beam from the laser 218 and to cause it to be made incident upon the second rotary mirror 242 in parallel to the XY plane.

The photosensor 231 is disposed at a position at which laser beam emitted from the laser 211 and reflected by the first rotary mirror 241 at an incident angle of zero degree via the half mirror 221 can be detected via the half mirror 221.

The photosensor 232 is disposed at a position at which laser beam emitted from the laser 212 and reflected by the first rotary mirror 241 at an incident angle of zero degree via the half mirror 222 can be detected via the half mirror 222. The photosensor 233 is disposed at a position at which laser beam emitted from the laser 213 and reflected by the first rotary mirror 241 at an incident angle of zero degree via the half mirror 223 can be detected via the half mirror 223. The photosensor 234 is disposed at a position at which laser beam emitted from the laser 214 and reflected by the first rotary mirror 241 at an incident angle of zero degree via the half mirror 224 can be detected via the half mirror 224. The photosensor 235 is disposed at a position at which laser beam emitted from the laser 215 and reflected by the first rotary mirror 241 at an incident angle of zero degree via the half mirror 225 can be detected via the half mirror 225. The photosensor 236 is disposed at a position at which laser beam emitted from the laser 216 and reflected by the first rotary mirror 241 at an incident angle of zero degree via the half mirror 226 can be detected via the half mirror 226. The photosensor 237 is disposed at a position at which laser beam emitted from the laser 217 and reflected by the first rotary mirror 241 at an incident angle of zero degree via the half mirror 227 can be detected via the half mirror 227. The photosensor 238 is disposed at a position at which laser beam emitted from the laser 218 and reflected by the first rotary mirror 241 at an incident angle of zero degree via the half mirror 228 can be detected via the half mirror 228.

Figure 7:
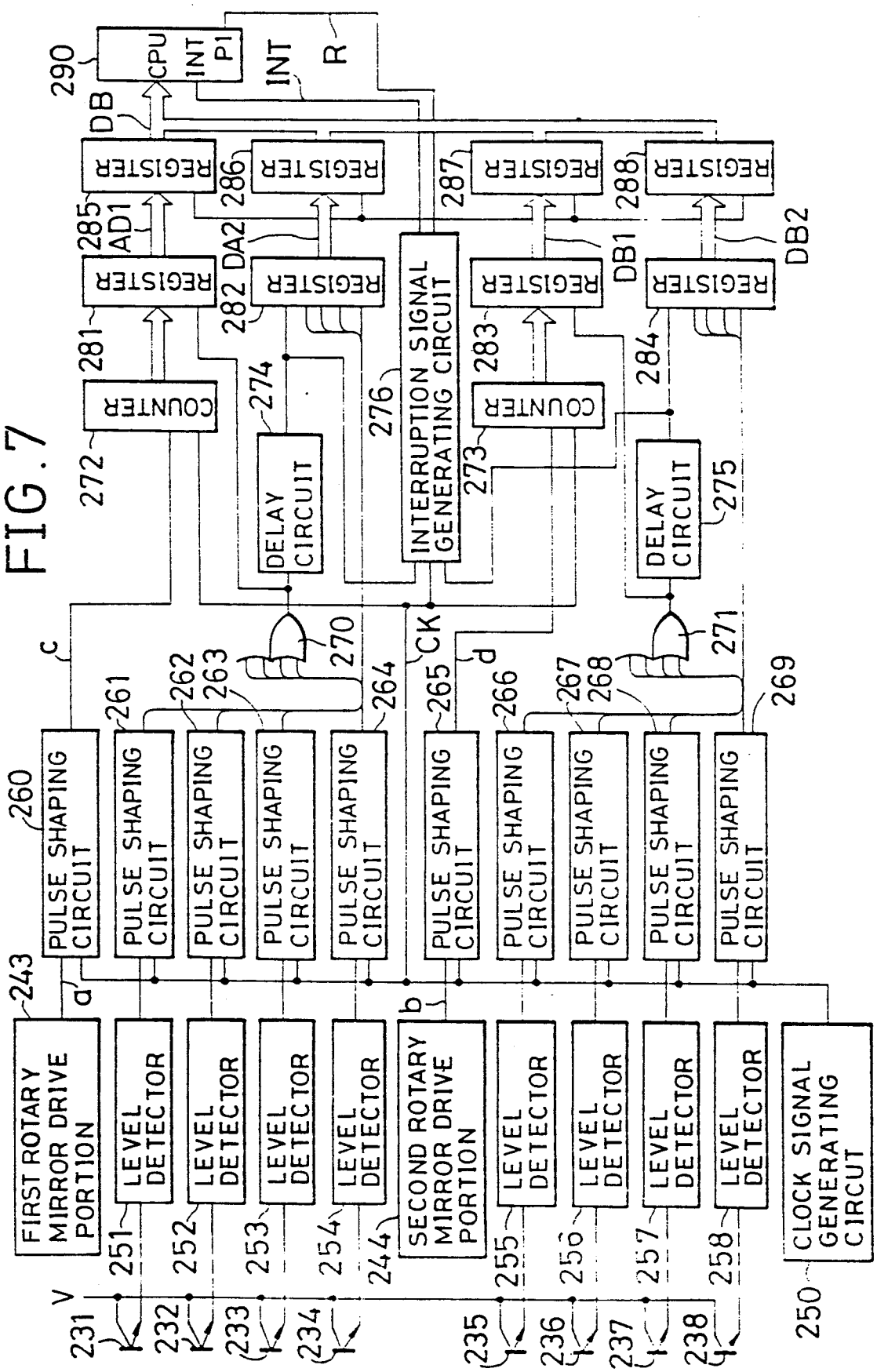
FIG. 7 is a block diagram of an electric circuit for use in the second embodiment.

FIG. 7 is a block diagram of an electric circuit for use in the second embodiment. Referring to FIG. 7, reference numeral 243 represents a first rotary mirror drive portion capable of counterclockwise rotating the first rotary mirror 241 shown in FIG. 5 at uniform angular velocity $\omega$. The first rotary mirror drive portion 243 is also capable of transmitting pulse signal "a" of logic "1" having a predetermined pulse width Tpw when the normal line of the surface of the first rotary mirror 125 agrees with the passage through which the incident light beam emitted from the laser 211 passes, the condition when they agree with each other being arranged to be the reference position. The pulse width Tpw of the pulse signal "a" is arranged to be shorter than time Tf which is taken for the first rotary mirror 241 to complete its one rotation. Reference numeral 244 represents a second rotary mirror drive portion capable of rotating the second rotary mirror 242 shown in FIG. 5 clockwise at uniform angular velocity $\omega$. The second rotary mirror drive portion 244 is also capable of transmitting pulse signal "b" of logic "1" having a predetermined pulse width Tpw when the normal line of the surface of the second rotary mirror 242 agrees with the passage through which the incident light beam emitted from the laser 215 passes, the condition when they agree with each other being arranged to be the reference position. The pulse width Tpw of the pulse signal b is arranged to be shorter than time Tf which is taken for the second rotary mirror 242 to complete its one rotation.

Reference numeral 250 represents a clock signal generating circuit capable of transmitting clock signal CK having a predetermined period Tck.

Reference numerals 251 to 258 represent level detection circuits each of which is constituted similarly to each other by resistors and operation amplifiers. The level detection circuits 251 to 258 are capable of converting a photoelectric current transmitted from the emitter of the photosensors 231 to 238 into voltage.

Furthermore, the level detection circuits 251 to 258 cause their output signals to be logic "1" when the thus converted voltage reaches a predetermined reference level.

Reference numerals 260 to 269 represent pulse shaping circuits each of which is similarly constituted by a flip-flop and a logical circuit and capable inputting the clock signal CK, detecting that the input signal has been changed from logic "0" to logic "1", and transmitting a pulse signal having the width of one clock pulse. The input of the pulse shaping circuit 260 is connected to the output of the first rotary mirror drive portion 243. The inputs of the pulse shaping circuits 261 to 264 are connected to the outputs of the level detection circuits 251 to 254. The input of the pulse shaping circuit 265 is connected to the output of the second rotary mirror drive portion 244. The inputs of the pulse shaping circuits 266 to 269 are connected to the outputs of the level detection circuits 255 to 258.

Reference numerals 270 and 271 represent OR circuits each of which has four inputs, the four inputs of the OR circuit 270 being connected to the outputs of the pulse shaping circuits 261 to 264. On the other hand, the four inputs of the OR circuit 271 are connected to the outputs of the pulse shaping circuits 266 to 269. Reference numerals 272 and 273 represent counters each of which is arranged to be capable of counting freely in response to the clock signal CK. The counter 272 is arranged to be reset in response to the pulse signal C transmitted from the pulse shaping circuit 260. The counter 273 is arranged to be reset in response to the pulse signal "d" transmitted from the pulse shaping circuit 265.

Reference numerals 274 and 275 represent delay circuits each of which is similarly constituted by a flip-flop and a logical circuit. The delay circuit 247 receives the output signal from the OR circuit 270 and the clock signal CK, and transmits the output signal from the OR circuit 270 delaying by one clock. The delay circuit 275 receives the output signal from the OR circuit 271 and the clock signal CK, and transmits the output signal from the OR circuit 271 delaying by one clock.

Reference numeral 276 represents an interruption signal generating circuit constituted by a flip-flop and a logical circuit and capable of inputting the output signals from the delay circuits 274 and 275 and the clock signal CK. The interruption signal generating circuit 276 is further capable of transmitting interruption signal INT to a CPU 290 to be described later after it has caused the interruption signal INT to be logic "1" on condition that either of the pulse signals from the delay circuits 274 or 275 is inputted and then the other pulse signal is inputted or if both the pulse signals are inputted. In addition, the interruption signal generating circuit 276 causes the interruption signal INT to be logic "0" if pulse reset signal R of logic "1" is inputted thereto from the CPU 290.

Reference numerals 281 and 282 represent registers, the input of the register 281 being connected to the output of the counter 272 so as to latch output data from the counter 272 as first angular data DA1 in response to the pulse signal transmitted from the OR circuit 270. The outputs of the pulse shaping circuits 261 to 264 are connected to the 4 least significant bits of the input of the register 282 so as to be registered as first detection data DA2 in response to the pulse signal transmitted from the delay circuit 274. That is, the output of the pulse shaping circuit 261 is connected to input LSB of the register 282, the output of the pulse shaping circuit 262 is connected to input 2LSB, the output of the pulse shaping circuit 263 is connected to input 3LSB, and the output of the pulse shaping circuit 264 is connected to input 4LSB. The input of the register 283 is connected to the output of the counter 273 so that output data from the counter 273 is registered as second angular data DB1 in the register 283 in response to the pulse signal transmitted from the OR circuit 271. The outputs of the pulse shaping circuits 266 to 269 are connected to the 4 least significant bits of the input of the register 284 so as to be registered as second detection data DB2 in response to the pulse signal transmitted from the delay circuit 275. That is, the output of the pulse shaping circuit 266 is connected to input LSB of the register 284, the output of the pulse shaping circuit 267 is connected to input 2LSB, the output of the pulse shaping circuit 268 is connected to input 3LSB, and the output of the pulse shaping circuit 268 is connected to input 4LSB. The registers 285 to 288 are tri-state output type registers having the inputs connected to the outputs of the registers 281 to 284 so that output data from the registers 281 to 284 are latched by the registers 285 to 288 when the interruption signal is changed from logic "0" to logic "1".

Reference numeral 290 represents a CPU connected to the outputs of the registers 285 to 288 via a data bus DB so as to input data registered in the registers 285 to 288 when the interruption signal INT becomes logic 1". After data has been inputted, the CPU 290 transmits pulse reset signal R of logic "1" to the output port P1.

Figure 8A:
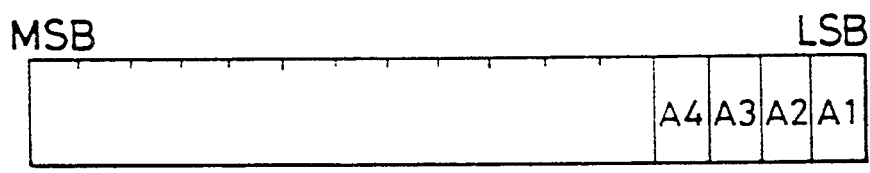
FIG. 8(a) is a view of a first detection data format for use in the second embodiment.
Figure 8B:
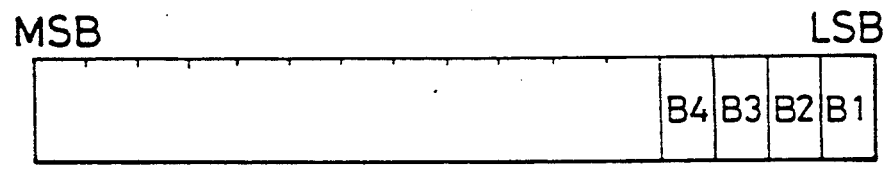
FIG. 8(b) is a view of a second detection data format for use in the second embodiment.

In FIGS. 8(a) and 8(b) are illustrated formats of the first and second detection data DA2 and DB2. Referring to the drawings, the fact that bit A1 is logic "1" indicates that reflected light is detected by the photosensor 231, the fact that bit A2 is logic "1" indicates that reflected light is detected by the photosensor 232, the fact that bit A3 is logic "1" indicates that reflected light is detected by the photosensor 233, and the fact that bit A4 is logic "1" indicates that reflected light is detected by the photosensor 234. Furthermore, the fact that bit B1 is logic "1" indicates that reflected light is detected by the photosensor 235, the fact that bit B2 is logic "1" indicates that reflected light is detected by the photosensor 236, the fact that bit B3 is logic "1" indicates that reflected light is detected by the photosensor 237, and the fact that bit B4 is logic "1" indicates that reflected light is detected by the photosensor 238.

The above-described angle detection means comprises the first and second rotary mirror drive portions 243 and 244, the clock signal generating circuit 250, the pulse shaping circuits 260 and 265, and the counters 272 and 273. The coordinate arithmetic means comprises the clock signal generating circuit 250, the level detection circuits 251 to 258, the pulse shaping circuits 261 to 264 and 266 to 269, the OR circuits 270 and 271, the delay circuit 274 and 275, the interruption signal generating circuit 276, the registers 281 to 288, the CPU 290, and a program, to be described later, capable of operating the CPU 290.

The other structure is the same as that of the above-described embodiment.

Figure 9A:
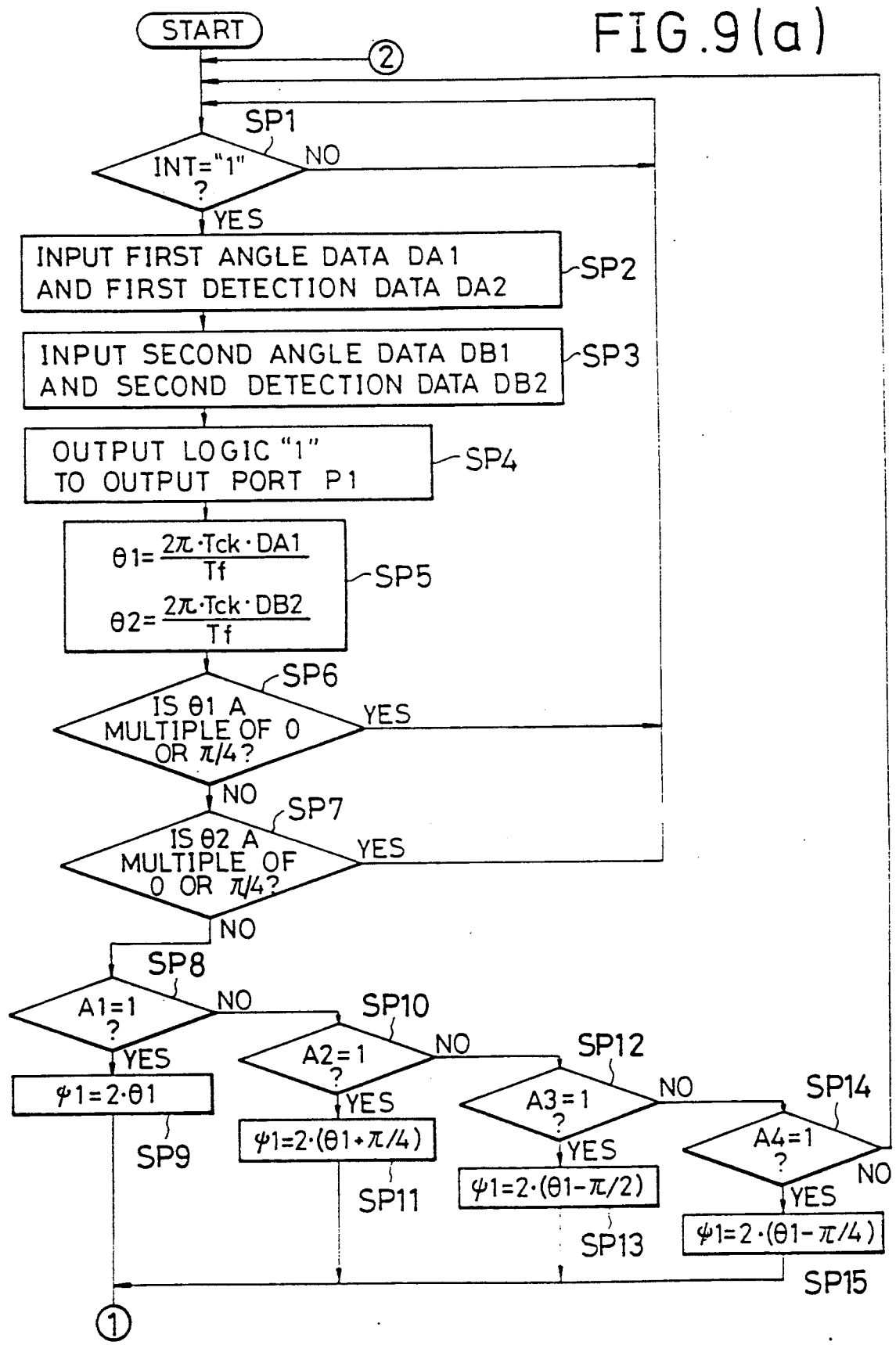
FIGS. 9(a) and 9(b) are flow charts of a program for use in the second embodiment.
Figure 9B:
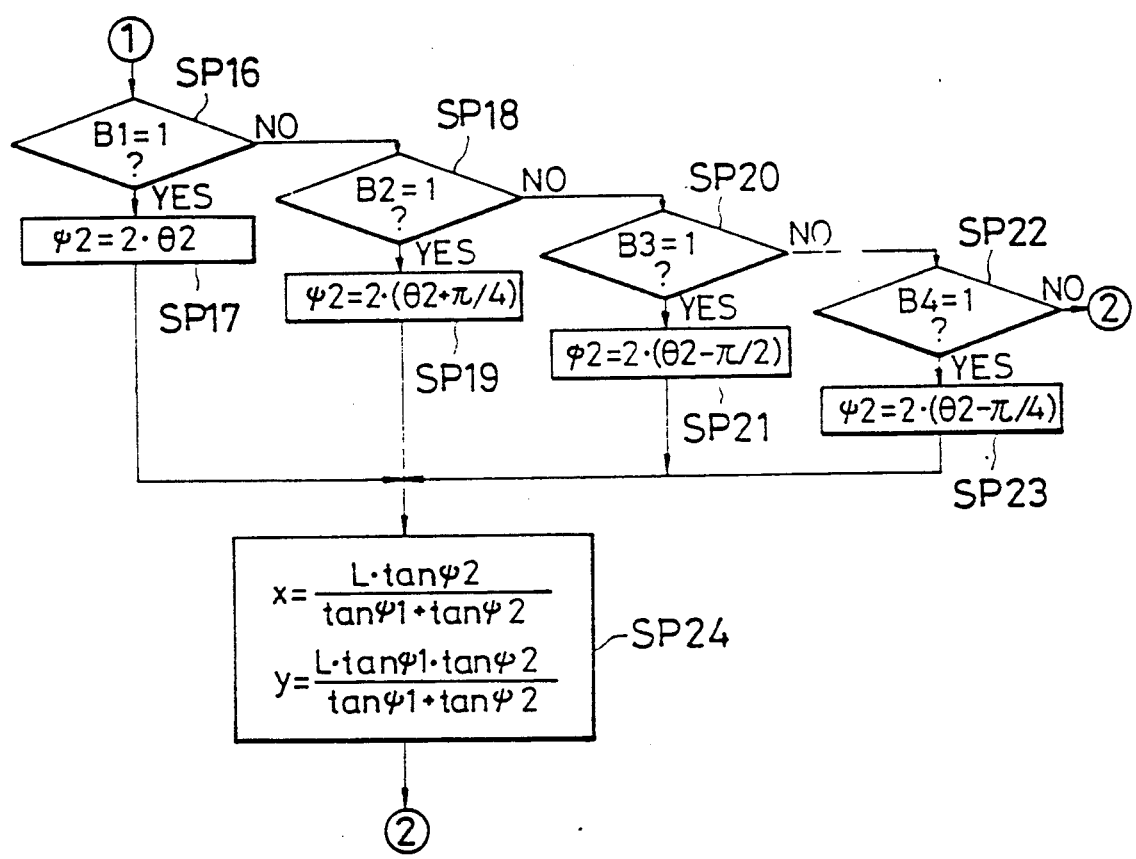

The operation of the embodiment of FIG. 5 thus structured will be described with reference to a flow chart for the program shown in FIG. 9.

Description will be made about the case in which the position of point P0 is inputted on the plane XY. The position indicator moves over the plane XY so as to cause the center of the hair cross mark of the mirror portion 113 to be at point P0.

After the laser beam emitted from any of the lasers 211 to 214 has passed toward the central axis of the hair cross mark of the mirror portion 113 of the position indicator 110 via specific point P1 of the first rotary mirror 241, the laser beam reflected by the mirror portion 113 is made incident upon the photosensor which corresponds to any of the lasers 211 to 214 via the first rotary mirror 241. At this time, the photoelectric current transmitted from the corresponding photosensor increases, causing the output signal from the level detection circuit which corresponds to this photosensor to become logic "1". As a result, a pulse signal is transmitted from the pulse shaping circuit which corresponds to this level detection circuit. In response to the pulse signal thus transmitted, first angular data DA1 from the counter 272 and representing the angle B1 of the normal line of the first rotary mirror 241 with respect to the above-described reference position is latched by the register 281. Furthermore, the first detection data DA2, determining which one of the photosensors 231 to 234 has detected reflected light, is latched by the register 282.

After the laser beam emitted from any of the lasers 215 to 218 has passed toward the central axis of the mirror portion 113 of the position indicator 110 via specific point P2 of the second rotary mirror 242, the light beam reflected by the mirror portion 113 is made incident upon the photosensor which corresponds to any of the lasers 215 to 218 via the second rotary mirror 242. As a result, the second angular data DB1 from the counter 273 and representing the angle of the normal line of the second rotary mirror 242 with respect to the above-described reference position is, similarly to the description above, latched by the register 283. Furthermore, the second angular data DB2 is latched by the register 284.

When the first and second angular data DA1 and DB1 and the first and second detection data DA2 and DB2 are latched by the registers 281 to 284, the interruption signal INT becomes logic "1" and the first and second angular data DA1 and DB1 and the first and second detection data DA2 and DB2 are registered by the registers 285 and 288. As a result, data are protected from being updated before or during the reading of data performed by the CPU 290.

The CPU 290 always supervises whether or not the interruption signal INT is logic "1" (SP1). When the interruption signal INT becomes logic "1" (SP2), the CPU 290 receives the first angular data DA1 and the second detection data DA2 from the registers 285 and 286 via the data bus DB (SP2), and receives second angular data DB1 and the second detection data DB2 (SP3). Then, the CPU 290 transmits a signal of logic "1" to the output port P1 for a predetermined time period (SP4). The CPU 290 calculates rotational angle B1 and B2 of the first and second rotary mirrors 241 and 242 by using the first and second angular data DA1 and DB1 in accordance with the following equation (SP5).

$$\theta 1 = 2\pi \cdot Tck \cdot DA1/Tf \text{ (radian)} \quad (7)$$

$$\theta 2 = 2\pi \cdot Tck \cdot DB1/Tf \text{ (radian)} \quad (8)$$

where symbol Tck represents the period of the clock signal CK, Tf represents time taken for the first and second rotary mirror 241 and 242 to complete its one rotation, which are previously stored in the computer memory as constants.

Then, it is determined whether or not the rotational angle $\theta 1$ of the rotary mirror 241 is 0 or a multiple of $\pi/4$ (SP6). That is, it is determined whether or not reflected light detected from the photosensor is light reflected by the position indicator 110. If it is determined that the rotational angle $\theta 1$ is 0 or a multiple of $\pi/4$, the program returns to SP1. If the rotational angle $\theta 1$ is not 0 or a multiple of $\pi/4$, it is determined whether or not the rotational angle $\theta 2$ of the second rotary mirror 242 is 0 or a multiple of $\pi/4$ (SP7). If it is determined that the rotational angle $\theta 2$ is 0 or a multiple of $\pi/4$, the program returns to SP1. If it is determined that the rotational angle B2 is not 0 or a multiple of $\pi/4$, it is determined whether or not bit A1 of the first detection data DA2 is 1 (SP8). If it is determined that A1=0, the program advances to SP10. If it is determined that A1=1, angle $\phi 1$ made between the light from the position indicator 110 and reflected by the rotary mirror 241 and X-axis is calculated in accordance with the following equation (SP9), and the program advances to SP16.

$$\phi 1 = 2 \cdot \theta 1 \quad (9)$$

If it is determined A1=0 in step SP8, it is determined whether or not bit A2 is 1 (SP10). If it is determined that A2=0, the program shifts to SP12. If it is determined that A2=1, angle $\phi 1$ is calculated in accordance with the following equation (SP11), and then the program shifts to SP16.

$$\phi 1 = 2 \cdot (\theta 1 + \pi/4) \quad (10)$$

If it is determined that A2=0 in SP 10, it is determined whether or not bit A3 is 1 (SP12). If it is determined that A3=0, the program shifts to SP14. If it is determined that A3=1, angle $\phi 1$ is calculated in accordance with the following equation (SP13), and then the program shifts to SP16.

$$\phi 1 = 2 \cdot (\theta 1 - \pi/2) \quad (11)$$

If it is determined that A3=0 in SP12, it is determined whether or not bit A is 1 (SP14). If it is determined that A4=0, the program returns to SP1. If it is determined that A4=1, angle $\phi 1$ is calculated in accordance with the following equation (SP15), and the program shifts to SP16.

$$\phi 1 = 2 \cdot (\phi 1 - \pi/4) \quad (12)$$

Then, it is determined whether bit B1 of the second detection data DB2 is 1 (SP16). If it is determined that B1=0, the flow shifts to SP 18. If it is determined that B1=1, angle $\phi 2$ between the light from the position indicator 110 and reflected by the rotary mirror 242 and X- axis is calculated in accordance with the following equation (SP17), and the program advances to SP24.

$$\phi 2 = 2 \cdot B2 \quad (13)$$

If it is determined that B1=0, a determination is made whether or not bit B2 is 1 (SP18). If it is determined that B2=0, the program shifts to SP20. If it is determined that B2=1, angle $\phi 2$ is calculated in accordance with the following equation (SP19), and then the program shifts to SP24.

$$\phi 2 = 2 \cdot (\theta 2 + \pi/4) \quad (14)$$

If it is determined that B2=0 in SP 18, it is determined whether or not bit B3 is 1 (SP20). If it is determined that B3=0, the program shifts to SP22. If it is determined that B3=1 angle $\phi 2$ is calculated in accordance with the following equation (SP21), and then the program shifts to SP24.

$$\phi 2 = 2 \cdot (\theta 2 - \pi/2) \quad (15)$$

If it is determined that B3=0 in SP 20, it is determined whether or not bit B4 is 1 (SP22). If it is determined that B4=0, the program, i.e., flow, returns to SP1. If it is determined that B4=1, angle $\phi 2$ is calculated in accordance with the following equation (SP23), and then the flow shifts to SP24.

$$\phi 2 = 2 \cdot (\theta 2 - \pi/4) \quad (16)$$

Then, X-coordinate and Y-coordinate of point P0 are calculated by using angles 11 and 12 in accordance with the following equations (SP24).

$$X = L \cdot \tan\phi 2 / (\tan\phi 1 + \tan\phi 2) \quad (17)$$

$$y = L \cdot \tan\phi 1 \cdot \tan\phi 2 / (\tan\phi 1 + \tan\phi 2) \quad (18)$$

where symbol L represents the distance between the first rotary mirror 241 and the second rotary mirror 242 and is previously stored in the program.

After X-coordinate and Y-coordinate have been obtained, the flow shifts to SP1.

According to the embodiment of FIG. 5, optical lasers are used as light sources. Another structure may be employed which is arranged such that one laser is used and a laser beam emitted from the laser according to another structure is made incident upon the first and second rotary mirrors 241 and 242 from a plurality of angles by using a half mirror, a mirror or the like.

According to the embodiment of FIG. 5, although rotary mirrors each of which has a mirror surface are employed as the first and second rotary mirrors 242 and 242, rotary mirrors each of which has a plurality of mirror surfaces may be employed. In this case, further accurate coordinates can be obtained since the intervals of the detections of the coordinates can be reduced by conducting calculations arranged to correspond to the polygon mirrors.

According to the embodiment of FIG. 5, the structure is arranged such that laser beams are incident on the first and second rotary mirrors 241 and 242 respectively from four directions. The intervals of the detection of coordinates can be further shortened by employing a structure arranged such that laser beams are made incident from a larger number of directions.

Figure 10:
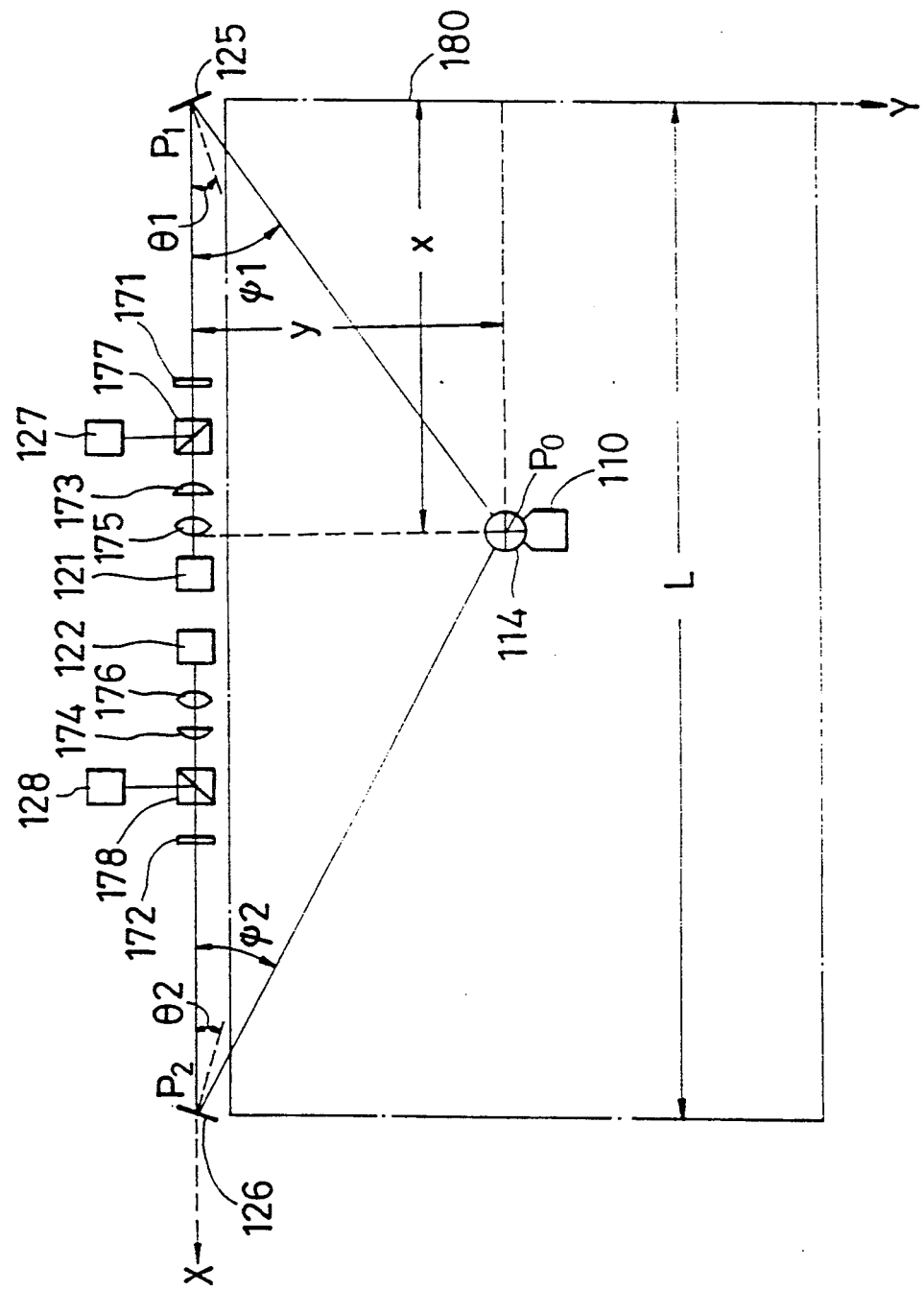
FIG. 10 is a view of an optical system for use in a third embodiment.

FIG. 10 is a view which illustrates the arrangement of an optical system for use in an additional embodiment. Referring to the drawing, the same components as those according to the embodiment of FIGS. 1(a) and 1(b) have the same reference numerals. That is, reference numeral 110 represents the position indicator, 121 and 122 represent lasers, 125 and 126 represent first and second rotary mirrors, 127 and 128 represent the first and second photosensors, 171 and 172 represent quarter wavelength plates, 173 and 174 represent cylindrical lenses, 175 and 176 represent lenses, 177 and 178 represent polarizing beam splitters, 180 represent coordinate input region.

Figure 11A:
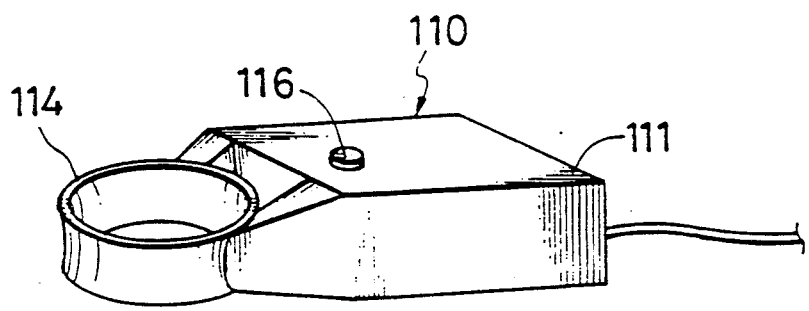
FIG. 11(a) is a perspective view of the position indicator according to the third embodiment.
Figure 11B:
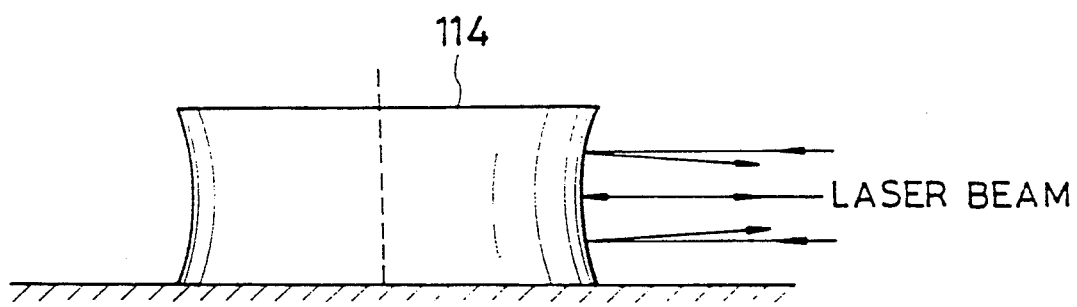
FIGS. 11(b) and 11(c) are views of the mirror portion of the position indicator.
Figure 11C:
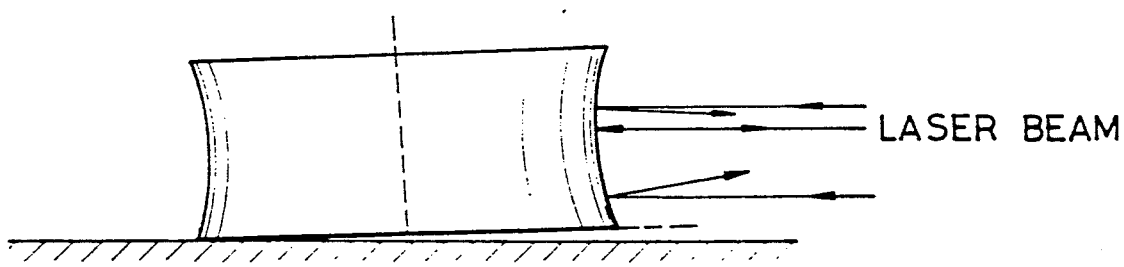

As shown in FIG. 11(a), the position indicator 110 is constituted in such a manner that a mirror portion 114 is disposed on one side surface of a box-like main body 111, the bottom portion of the main body 111 and the same of the mirror portion 114 being arranged such that they can be held parallel to plane XY. A transparent display plate (omitted from illustration) made of synthetic resin is attached to the above-described bottom surface of the mirror portion 114. A hair-cross mark showing the center of the mirror portion 114 is written on the above-described display plate. As shown in FIGS. 11(b) and 11(c), the side external mirror of the mirror portion 114 is inward curved (concave) at the central portion thereof. As a result, even if the laser beam incident upon the mirror portion 114 is not perpendicular to the center axis of the hair cross mark, a portion of the laser beams passing through the center axis of the hair cross mark can be reflected into same light passage. A coordinate calculation instruction signal generating circuit 115, to be described later, is provided in the main body 111. The coordinate calculation instruction signal generating circuit 115 is connected to a switch 116 disposed on the outer surface of the main body 111 and to an electric circuit to be described later so that when the switch 116 is switched on the coordinate calculation instruction signal generating circuit 115 is activated.

Each of the lasers 121 and 122 comprises a semiconductor laser. The structure is arranged in such a manner that the laser beam emitted by the laser 121 is incident on the polarizing beam splitter 177 disposed on X-axis in parallel to plane XY via the lens 175 and the cylindrical lens 173. The laser beam which has passed through the polarizing beam splitter 177 is incident on the rotation axis of the first rotary mirror 125 in parallel to plane XY via the quarter wavelength plate 171. On the other hand, the laser beam emitted by the laser 122 is incident on the polarizing beam splitter 178 disposed on X-axis in parallel to plane XY via the lens 176 and the cylindrical lens 174. The laser beam which has passed through the polarizing beam splitter 178 is incident upon the rotational axis of the first rotary mirror 126 in parallel to plane XY via the quarter wavelength plate 172.

The lens 175 is a lens arranged to have a focal length causing laser beams which have been reflected at point P1 to be focused at the center of the coordinate input region 180 on the plane XY. The lens 176 is a lens arranged to have a focal length causing laser beams which have been reflected at point P2 to be focused at the center of the coordinate input region 180 on the plane XY. Thus, the laser beams emitted from the lasers 121 and 122 are focused by the lenses 175 and 176. As a result, there is an intensity increase of the laser beams incident on the photosensors 127 and 128 after the laser beam has been reflected by the mirror portion 114, and irregular reflection of laser beams caused from the mirror portion 114 is substantially prevented.

The cylindrical lenses 173 and 174 are disposed so as to cause the laser beams emitted from the lasers 121 and 122 to form band-like shapes and so as to cause the plane of the laser beams to be perpendicular to plane XY. The laser beams which do not pass through the center axis of the mirror portion 114 are reduced and irregular reflection of the laser beams reflected from the mirror portion 114 is prevented by making the laser beams in the form of a band-like shape and perpendicular to the plane XY.

Figure 12:
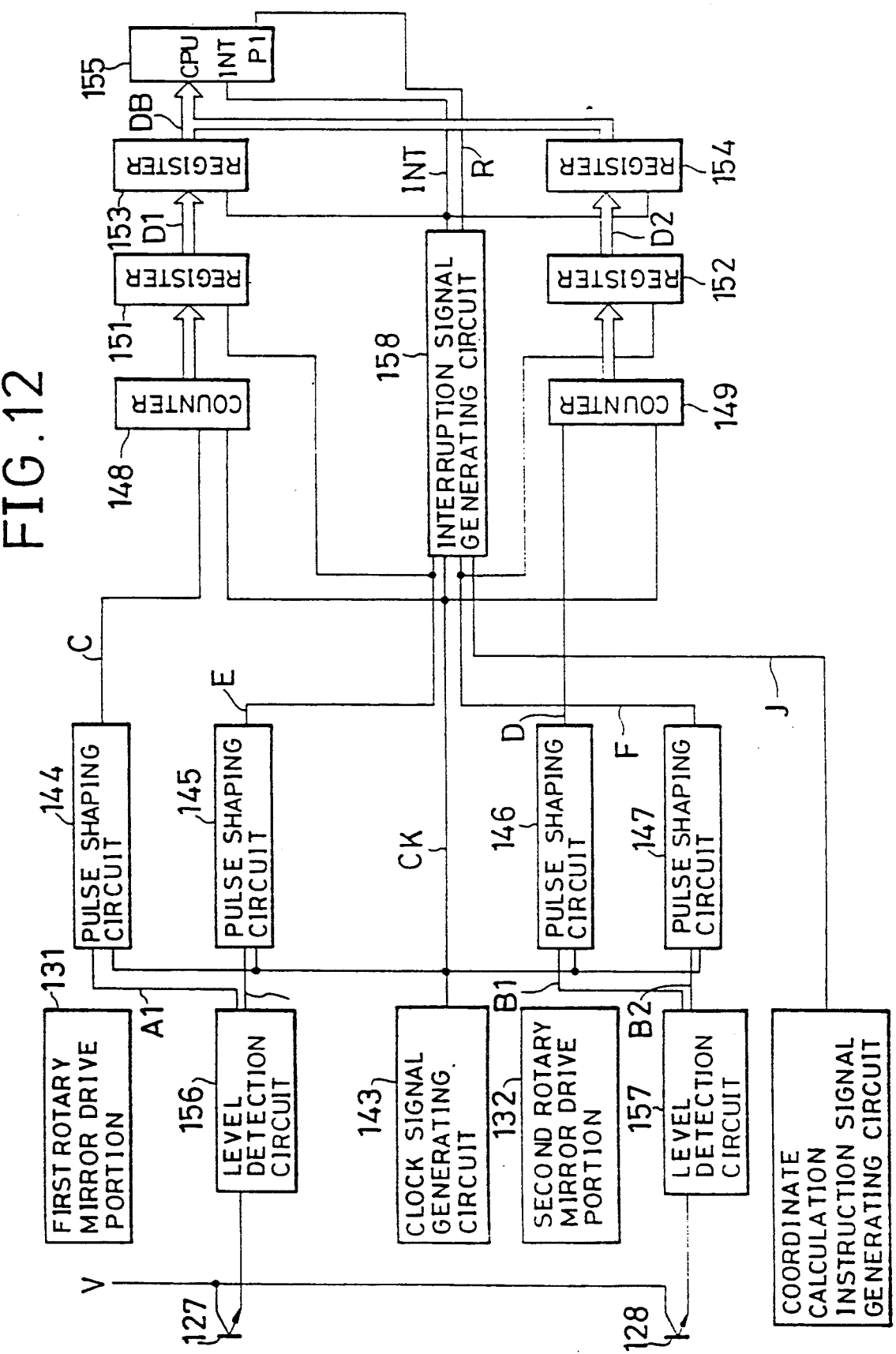
FIG. 12 is a block diagram of the electric circuit for use in the third embodiment.

FIG. 12 is a block diagram of the electric circuit for use in the embodiment of FIG. 10. The same components as those according to the embodiment of FIGS. 1(a) and 1(b) are given the same reference numerals. The difference from the first embodiment lies in that the above-described coordinate calculation instruction signal generating circuit 115 is further provided, and in the structure of the level detection circuits 156 and 157 and the interruption signal generating circuit 158.

The coordinate calculation instruction signal generating circuit 115 is capable of deriving coordinate calculation instruction signal J of logic "1" when the switch 116 is switched on.

The level detection circuits 156 and 157 are structured similarly to each other and include a resistor and an operation amplifier. The level detection circuit 156 converts a photoelectric current transmitted from the emitter of the first photosensor 127 into voltage Vph1, the voltage Vph1 being then compared with first and second detection reference levels Vth1 and Vth2 so as to derive signals A1 and A2. If Vth2<Vth1 and also Vth1≦Vph1, signal A1 of logic "1" is transmitted to the pulse shaping circuit 144. If Vth2≦Vph1<Vth1, signal A2 of logic "1" is transmitted to the pulse shaping circuit 145. Similarly, the level detection circuit 157 converts a photoelectric current transmitted from the emitter of the second photosensor 128 into voltage Vph2, the voltage Vph2 being then compared with first and second detection reference levels Vth1 and Vth2 so as to transmit signals B1 and B2. If Vth1≦Vph1, signal B1 of logic "1" is transmitted to the pulse shaping circuit 146. If Vth2≦Vph1<Vth1, signal B2 of logic "1" is transmitted to the pulse shaping circuit 147.

The pulse shaping circuit 144 receives signal A1 and clock signal CK so as to transmit signal C. The pulse shaping circuit 145 receives signal A1 and clock signal CK so as to derive signal E. The pulse shaping circuit 146 receives signal B1 and clock signal CK so as to derive signal D. The pulse shaping circuit 147 receives signal B2 and clock signal CK so as to derive signal F.

The interruption signal generating circuit 158 is constituted by a flip-flop and a logical circuit, responsive to the output signals E and F from the pulse shaping circuits 145 and 147, the coordinate calculation instruction signal J, and the clock signal CK. The interruption signal generating circuit 158 derives interruption signal INT. The interruption signal generating circuit 158 is further capable of transmitting interruption signal INT to a CPU 155 to be described later after circuit 158 has caused the interruption signal INT to be logic "1," on condition that the logic of the coordinate calculation instruction signal J is "1" and either the pulse signal E or F is derived and then the other pulse signal is derived or if the logic of the coordinate calculation instruction signal J is "1" and both the pulse signals E and F are simultaneously derived. In addition, the interruption signal generating circuit 158 causes the interruption signal INT to be logic "0" if pulse reset signal R of logic "1" is supplied thereto from the CPU 155.

The operation of the embodiment of FIG. 10 is now described.

Description will be made about the case in which the position of point P0 in the coordinate input region 180 shown in FIG. 10 is to be determined. First, the position indicator 110 is moved so as to cause the center of the hair cross mark of the mirror portion 114 to agree with point P0, and then the switch 116 is switched on. The laser beam emitted from the laser 121 is made incident upon the polarizing beam splitter 177 via the lens 175 and the cylindrical lens 173. If the incident laser beam is, for example, non-polarizing light, a laser beam having a polarizing plane in a predetermined direction is made incident upon the first rotary mirror 125 after the beam has passed through the polarizing beam splitter 177 and the quarter wavelength plate 171. In the case where the laser beam is perpendicularly incident upon the surface of the first rotary mirror 125, the reflected light is made incident upon polarizing beam splitter 177 after passing through quarter wavelength plate 171 on the same optical passage as that through which the incident light beam passes. At this time, light reflected by first rotary mirror 125 is caused to be a linear polarized light whose polarized plane is different from the incident light by 90 degrees by the quarter wavelength plate 171, the linear polarized light being then reflected by polarizing beam splitter 177 so as to be made incident upon the photosensor 127. The laser beam reflected by the mirror portion 114 of the position indicator 110 is similarly detected by the photosensor 127.

Similarly, laser beam emitted from the laser 122 and directly reflected by the second rotary mirror 126 and also reflected light by the mirror portion 114 of the position indicator 110 are detected by the second photosensor 128.

It is not necessary for the laser beams emitted from the lasers 121 and 122 to be non-polarized light. They may, of course, be laser beams having polarized planes and thereby are transmissible through the polarizing beam splitters 177 and 178.

When reflected light is made incident upon the first photosensor 127, the transmitted photoelectric current is increased. However, since this increase is based on the intensity of light, the degree of increase in the photoelectric current is higher in light directly reflected by the first rotary mirror 125 than in light reflected by the mirror portion 114 of the position indicator 110 by virtue of greater light intensity due to the reduced degree of light scattering or the like. Similarly, the direct reflected light by the second rotary mirror 126 and reflected light by the mirror portion 114 of the position indicator 110 indicate the difference that direct reflected light by the second rotary mirror 126 has greater light intensity.

The first detection reference level Vth1 is determined with which light directly reflected by the first and second rotary mirrors 125 and 126 can be detected, while the second detection reference level Vth2 is determined with which light reflected by the mirror portion 114 of the position indicator 110 can be detected.

When the first photosensor 127 detects light directly reflected by the first rotary mirror 125, the counter 148 is reset by the signal C transmitted from the pulse shaping circuit 144. When the same detects light reflected by the mirror portion 114 of the position indicator 110, output data from the counter 148 is latched by the register 151 by the signal E transmitted from the pulse shaping circuit 145 so as to be registered as angular data D1 representing the angle θ1 of the laser beam as it is incident on the first rotary mirror 125.

When the second photosensor 128 detects light directly reflected by the second rotary mirror 126, the counter 149 is reset by the signal D transmitted from the pulse shaping circuit 146. When the same detects light reflected by the mirror portion 114 of the position indicator 110, output data from the counter 149 is latched by the register 152 by the signal F transmitted from the pulse shaping circuit 147 so as to be registered as angular data D2 representing the angle θ2 of the laser beam as it is incident on the second rotary mirror 126. Furthermore, angular data D1 and D2 are latched by the registers 153 and 154 by the interruption signal INT.

The CPU 155 conducts the processings similarly to the first embodiment, causing the X-coordinate and Y-coordinate of point P0 of position indicator 110 to be thus calculated.

According to the embodiment of FIG. 10, although rotary mirrors each of which has a mirror surface are employed as the first and second rotary mirrors 125 and 126, rotary mirrors each of which has a plurality of mirror surfaces may be employed. In this case, more accurate coordinate indications can be obtained since the intervals of the detections of the coordinates can be reduced by conducting calculations arranged to correspond to the polygon mirrors.

Although the coordinate calculation instruction signal J is supplied to the interruption signal generating circuit 158 via a cable in the third embodiment, it may be transmitted by means of ultrasonic waves or infrared rays.

Figure 13A:
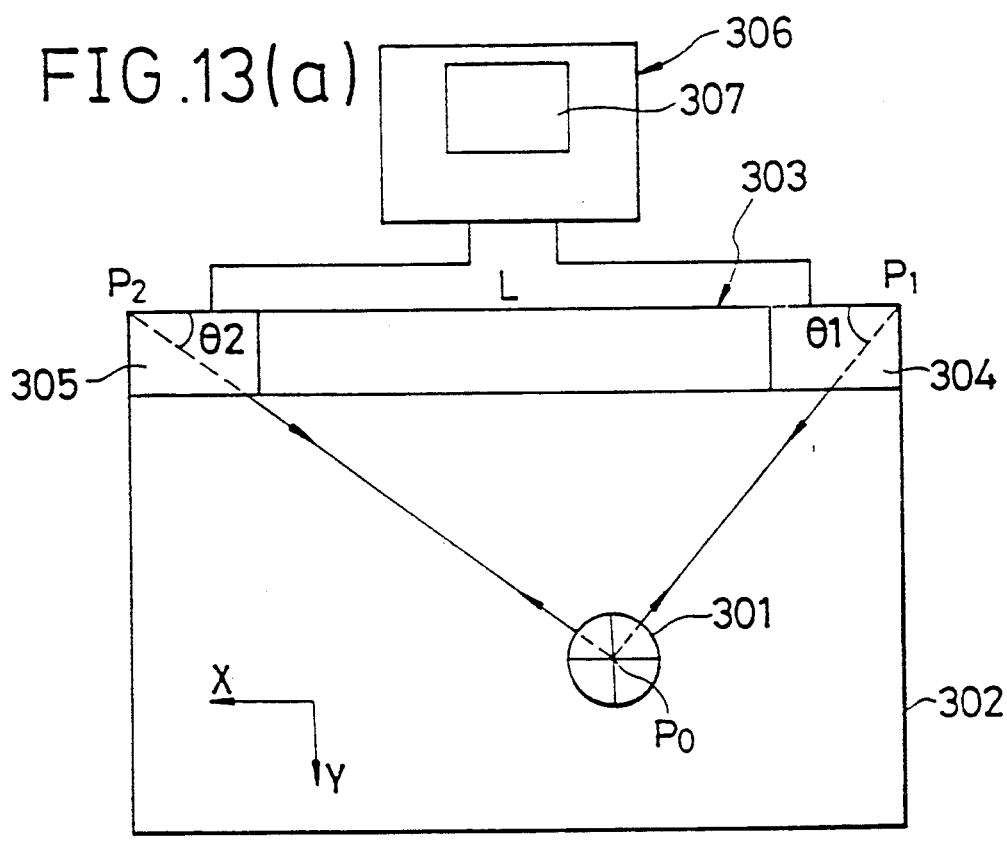
FIGS. 13(a) and 13(b) are schematic views of a coordinate input apparatus according to a fourth embodiment.
Figure 13B:
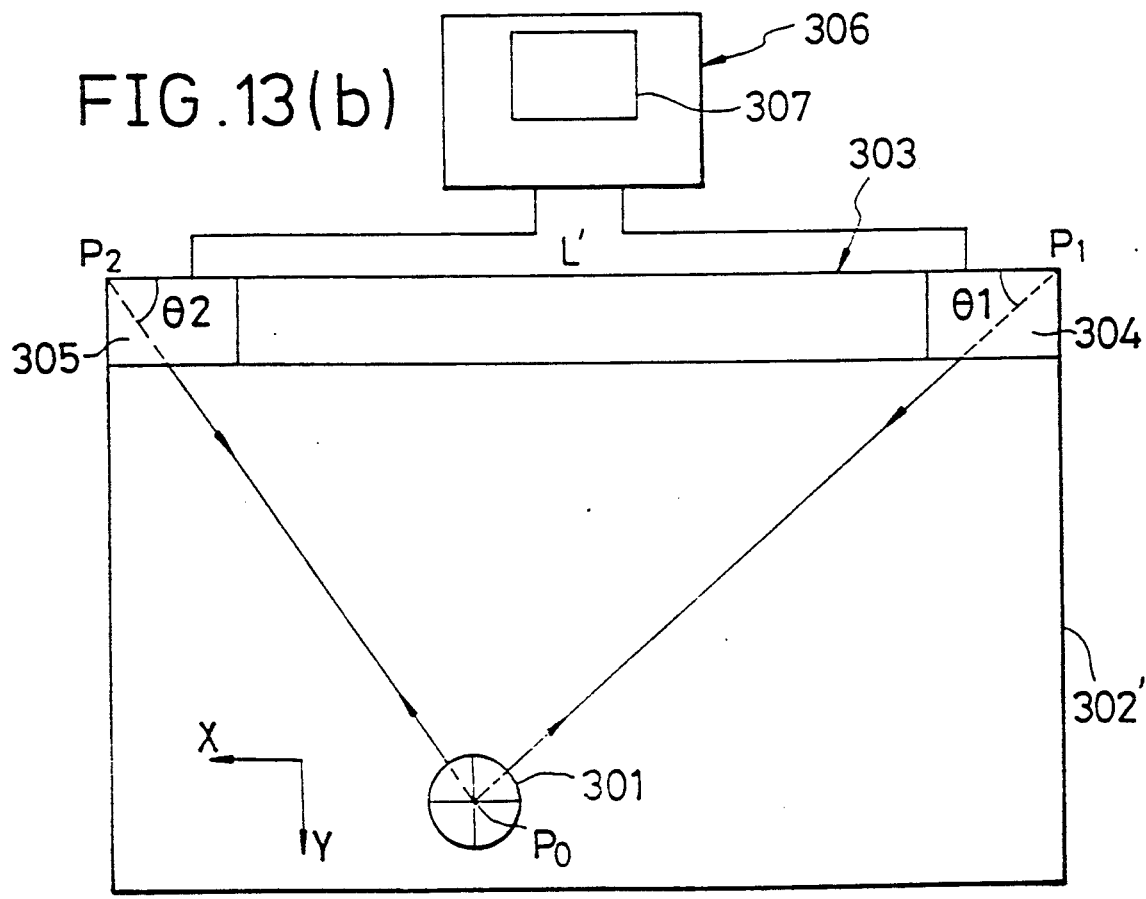
Figure 14:
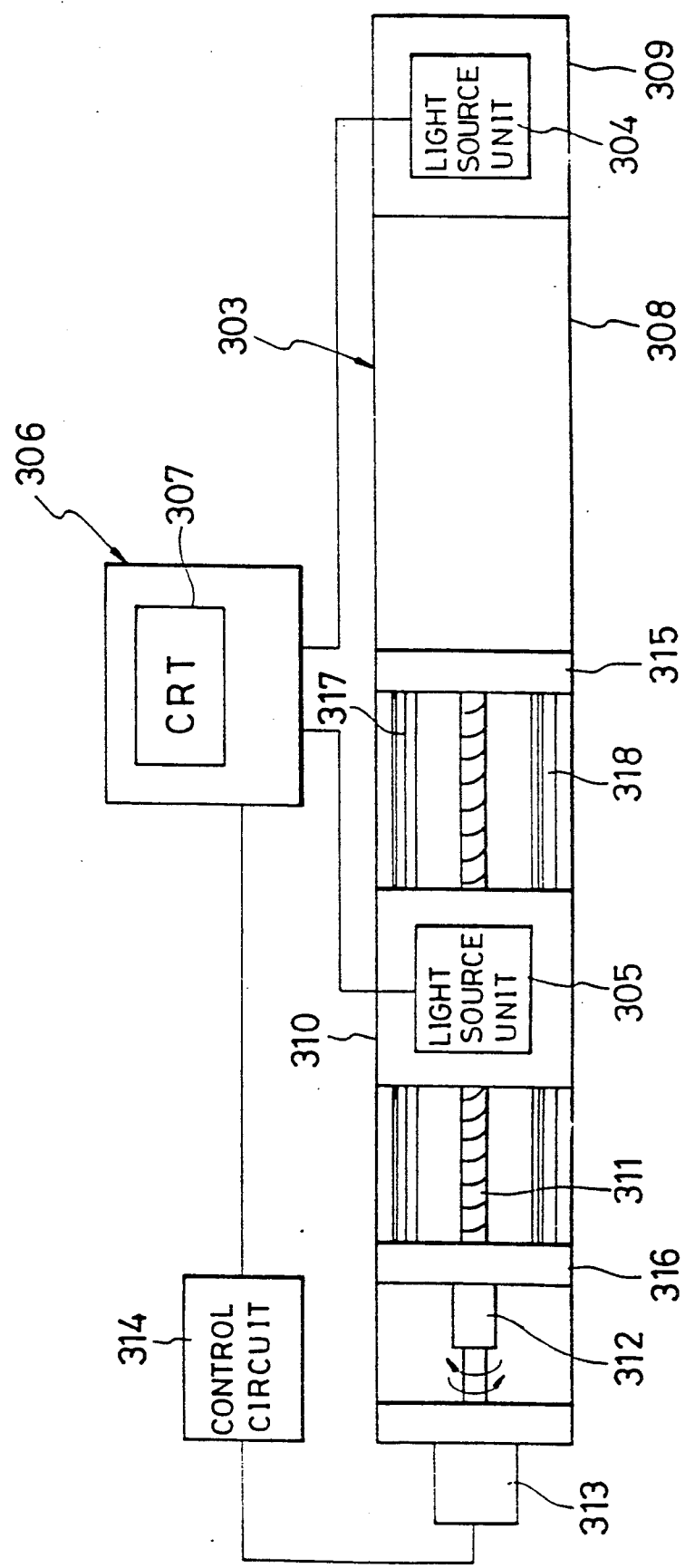
FIG. 14 is a front elevational view of a light source portion of the coordinate input apparatus.

FIGS. 13(a), 13(b), and 14 are views of a further embodiments of the present invention. The structure of this embodiment is similar in certain regard to the above-described embodiments. This embodiment is characterized in that the pair of light source units can be adjusted in accordance with the area of the coordinate input region.

In FIG. 13(a), the coordinate deriving apparatus according to the present invention is used in a relatively narrow coordinate plane where the distance between the pair of optical sources is relatively short.

In FIG. 13(b), the coordinate deriving apparatus according to the present invention is used in a relatively wide coordinate plane, where the distance between the pair of light sources is relatively long. That is, a coordinate plane 302' shown in FIG. 13(b) has a larger size than that of a coordinate plane 302 shown in FIG. 13(a), and distance L' between points P1 and P2 is arranged to be longer than that of the coordinate plate 302. The distance L' can be manually or automatically specified by relatively moving the right and left light sources along the reference line.

FIG. 14 is a front elevational view of a light source portion of the coordinate input apparatus according to the present invention. A light source portion 303 comprises a lengthened base member 308 for defining the reference line, a fixed light source unit 304 secured, via a fixed table 309, to the right end portion of the base member 308, and a movable light source unit 305 mounted on a movable table 310 which is capable of moving along the reference line. The movable light source portion 303 includes a drive mechanism for automatically moving the movable light source unit 305. The drive mechanism comprises a ball screw or a lead screw 311 inserted into the movable table 310 on which the movable light source unit 305 is mounted, an electric motor such as a stepping motor which is coupled, via a coupling 312, to the lead screw 312 for the purpose of rotating the lead screw 312, and a control circuit 314 capable of controlling the rotation of the electric motor 313 so as to determine the distance L between the specific points P1 and P2. The control circuit 314 is connected to a calculating portion 306 so that the control circuit 314 automatically controls the rotation of the stepping motor 313 and thereby relatively, with respect to the fixed light source 304, moves the movable light source unit 305 mounted on the movable table 310 via the lead screw 311 by supplying a signal representing the value of L, which corresponds to the specified coordinate plane, to the calculating portion 306. The output terminals of the pair of light source units 304 and 305 are connected to the calculating portion 306 via cables.

The lead screw 311 is carried by a pair of spaced fixed plates 315. The movable table 310 is supported by a pair of guide rails 317 and 318 so as to be capable of moving along the reference line.

The calculating portion 306 includes a CPU so as to calculate, similarly to the above-described embodiments, the coordinate instructed by the position indicator (cursor) 301 in accordance with the angular data θ1 and θ2 obtained similarly to those obtained according to the above-described embodiments and data L representing the distance between two points, the data L being previously inputted. A cathode ray tube (CRT) 307 or an electronic overhead projector (OHP) using transmission type liquid crystal display elements is connected to the CPU so as to visually display the results of the calculations. The motor control circuit 314 is also connected to the CPU so as to control the operation of the stepping motor 313 of the light source portion 303 in accordance with data L which has been previously inputted to the CPU.

The operation of the optical coordinate input apparatus according to this embodiment is now described. As shown in FIGS. 13(a) or 13(b), the light source portion 303 is positioned on the top surface of the input coordinate plane. Then, the distance L (the distance between a pair of specific points P1 and P2) between the pair of light source units 304 and 305 is inputted to the CPU of the calculating portion 306 in accordance with the size of the input coordinate plane. In accordance with the value L thus inputted, the motor control circuit 314 rotates the stepping motor 313 of the light source portion 303 by a predetermined degree so as to move the movable light source unit 305 along the reference line. As a result, the distance from the movable light source unit 305 to the fixed light source unit 304 is coincided with the specified value L.

Then, a light reflection type cursor 301 is disposed on the given coordinate plane 302, and the center axis thereof is caused to agree with a desired coordinate P0 (x, y) by using a collimator. The coordinate instruction obtained by using the cursor 301 can be conducted continuously because of high angular scanning speed of the incident light.

Then, the pair of the light source units 304 and 305 are operated so as to angularly scan the incident line and calculate the coordinate P0 (x, y) by triangulation principles.

According to this embodiment, the distance between the pair of the light source units is automatically determined in accordance with the size of the given coordinate input plane by using the stepping motor and the lead screw. However, the distance L between the light source units can be manually adjusted. In this case, the structure is so arranged that the movable light source unit is simply moved along the guide rails. After the distance has been specified manually, the calculation and derivation of the value L are performed as follows: first, the cursor is disposed at a predetermined point, and θ1 and θ2 are obtained by scanning the incident light. Then, with the cursor moved from the predetermined point to another point, the distance therebetween being known, the incident light is scanned so as to obtain θ1 and θ2. By using the thus obtained data θ1, θ2, θ1', θ2', and D, an inverse triangulation operation is performed to obtain the distance L between the specific points P1 and P2. Then, coordinate inputs with the light reflection type cursor are determined by using the value L thus obtained.

The above-described optical structure of the optical unit serves as only examples. A variety of modifications can be available. Furthermore, the light reflection type cursor may also be modified variously. In addition, the moving structure of the movable optical portion is, of course, modified variously.

Figure 15A:
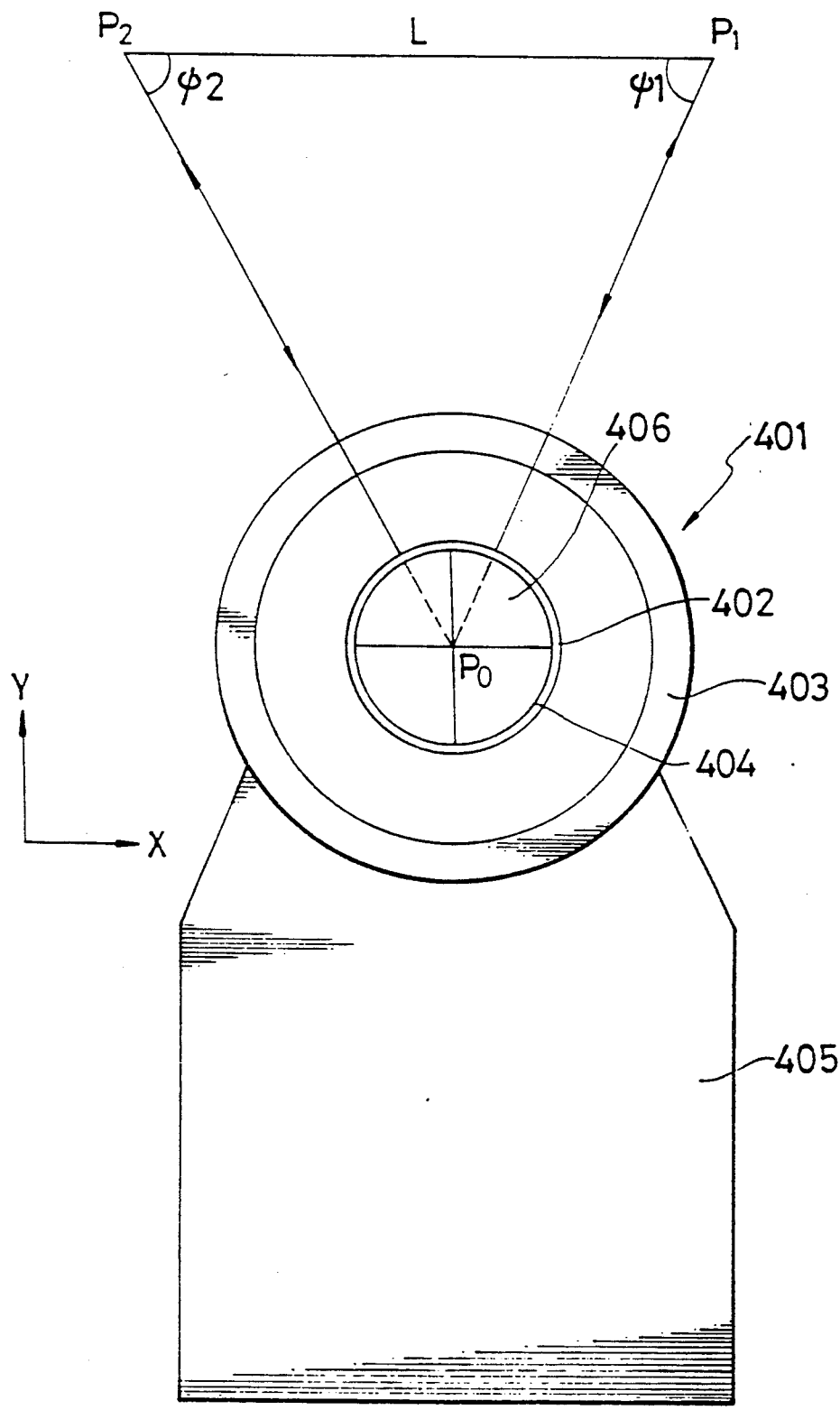
FIG. 15(a) is a plan view of an optical recursively-reflecting type coordinate input cursor.
Figure 15B:
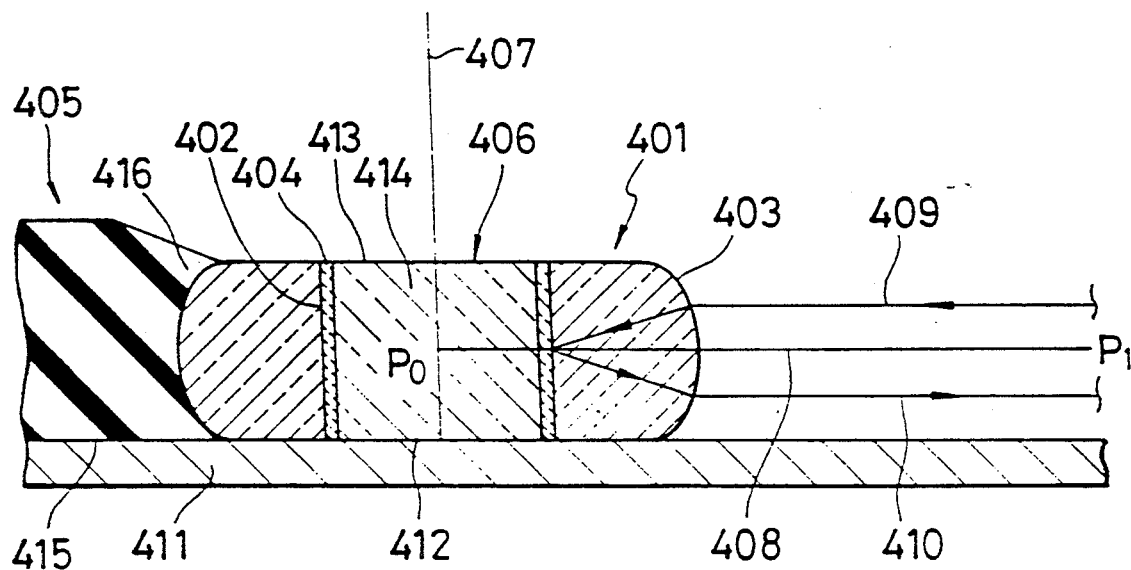
FIG. 15(b) is a cross sectional view of the reflection type position indicator.

FIGS. 15(a), 15(b), an 15(c) are views of a modification to the position indicator (the cursor). This modification is characterized by the incident light passing toward the center axis of the cursor, which represents the position of the cursor, being selectively reflected to provide a return reflected light beam to the light source. Furthermore, when the cursor is manually and continuously moved across a plane to provide continuous coordinate signals, the reflected light is kept within an incident optical passage even if the cursor is inclined with respect to the coordinate plane while the cursor is moving.

FIG. 15(a) is a plan view of a light reflection type cursor according to this embodiment. An annular lens member 401 having concentric inner surface 402 and an outer surface 403 is made of an optical material, for example, high refraction factor glass SLF-03 having a refraction factor of 1.83. A light reflection layer 404 is formed along the inner surface 402 so the mirrored surfaces of layer 404 are substantially equidistant from axis 407. The light reflection layer 404 is manufactured by evaporating metal such as aluminum or metal foil. The annular lens member 401 is supported by a support member 405 at a non-effective portion of the outer surface member and is arranged so it can be moved along the coordinate plate with the concentric axis retained with respect to the given plane XY. At the central portion of the annular lens member 401, there is provided a collimating member 406 having central point P1, through which the concentric axis passes, that coincides with an instructed specific point on the plane XY. The collimating member 406 has a hair cross line to be used for collimating.

FIGS. 15 (b) is a cross sectional view of the cursor shown in FIG. 15 (a) in such a manner that the cursor is illustrated in a cross-section plane including a line connecting the concentric axis of the annular lens member 401, central point P0 and light source P1. In cross section, inner surface 402 of the annular lens member 401 is parallel to the concentric axis 407. The outer surface 403 is ground so as to have an outwardly curved (convex) cross section with a predetermined curvature. Thus, the outer surface 403 constitutes a lens surface having an optical axis which is along the radial direction of the annular shape, the curvature of the outer surface being such that the focal point of the lens is on the inner surface 402. It is preferable that the annular lens member 401 have a high refraction factor in order to reduce the thickness of the portion between the outer surface 403 and the inner surface 402 and to reduce the size of the cursor. Incident light 409 from spaced light source P1 is reflected by the reflection layer 404, and is reflected as beam 410.

The collimating member 406 disposed at the central portion of the annular lens member 401 is made of, for example, a fiber optic plate. That is, the collimating member 406 comprises a bottom portion 412 positioned in contact with a XY plane 411, an upper surface 413 which is in parallel to the bottom portion 412, a parallel bundle of the optical fibers for connecting the bottom portion 412 and the upper surface 413, and a hair cross line mark corresponding to central point P0. The support member 405 comprises a bottom portion 415 which is positioned to be slidable with respect to the coordinate plane 411, and a fixed portion 416 for securing the non-effective outer surface of the annular lens member 401 such that the concentric axis 407 of the lens member 401 is perpendicular to the bottom portion 415.

The method of using the cursor of this embodiment is now described with reference to FIGS. 15(a) and 15(b). With the support member 405 of the cursor is held at a predetermined position on the plane XY, the central point of the cursor, that is, the central point P0 of the annular lens member 401 is moved so it is coincident with a desired specific point by using the collimating member 406. Since the collimating member 406 is, as described above, made of the fiber optic plate, the image on the XY coordinate plane positioned in contact with the bottom portion 412 of the collimating member 406 is retained as is after the image has passed through the optical fiber bundle 414 so as to be incident on the corresponding upper surface 413. Since the thus formed image has no substantial parallax, the desired point can be accurately specified by using the intersection of the hair cross line formed in the collimating member 406, that is, the central point P0, as the collimation with the thus formed image observed.

With the central point P0 of the cursor coincident with the coordinate point to be input, incident light beams to be scanned angularly along the coordinate plane are emitted from the light sources P1 and P2 which are spaced from each other by a predetermined distance L similarly to the above-described embodiments. As shown in FIG. 15(a), when an incident light beam 409 emitted from light source P1 coincides with optical axis 408 between the central point P0 and the light beam P1, the incident light 409 is reflected vertically by the reflection film 404 of the annular lens member 401 so that a reflected light beam 410 passes reversely through the same passage as the incident light beam 409 when viewed in a plane manner. The reflected light 410 returns to the light source P1 where it is detected. The angle $\phi 1$ is defined by the path of the incident light beam 409 and the reflected light beam 410 relative to the reference line connecting the light sources P1 and P2. Similarly, angle $\phi 2$ is the angle between the optical passage and the above-described reference line when the incident light and emitted light coincide. Thus, the coordinate of the central point P0 of the cursor is obtained in accordance with triangulation principles by using the thus obtained angles $\phi 1$ and $\phi 2$ and the distance L between the light sources. As a result, signals indicative of the desired coordinate are derived.

Figure 15C:
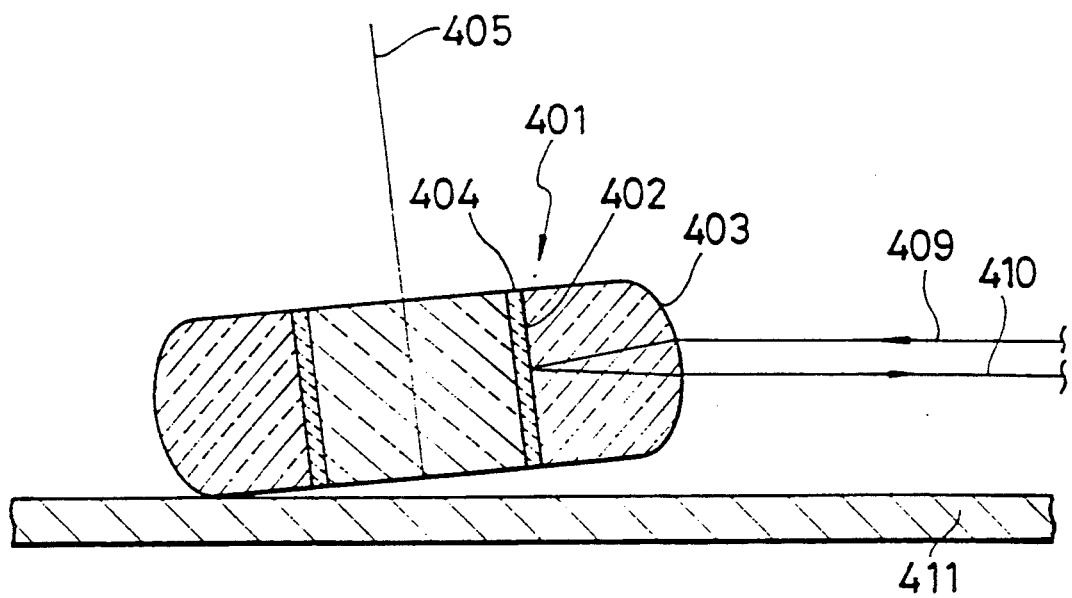
FIG. 15(c) is a drawing of the operation of the reflection type position indicator.

As shown in FIG. 15(c), in the continuous coordinate specifying mode, the bottom surface of the annular lens member 401 can be spaced from the XY coordinate plane 411 during the movement of the cursor, causing the concentric axis 407 to be temporarily inclined with respect to this plane 411. For example, the cursor can be shaken while the user is holding the cursor support member 405. Even if the concentric axis is inclined with respect to the coordinate plane 411, the reflected light beam 410 inversely passes through the same optical passage as the incident light beam 409 when viewed in a plane manner. That is, the incident light beam 409 which has passed through the plane including the concentric axis 407 and the radial optical axis is reflected and converged by the surface of the lens formed by the outer surface 403 of the annular lens member 401 so that it is imaged on the reflection layer 404 formed on the inner surface 402. The reason for this is that the curvature of the lens is such that the focal point of the lens is positioned on the inner surface 402. Therefore, the light beam reflected by the reflection layer 404 is reflected by the lens outer surface 403 by a so-called cat's-eye effect, and then propagates parallel to the incident light beam 409 toward the distant light source. Since the incident light beam 409 and the reflected light beam 410 are parallel to each other, they do not move away from each other.

If the cursor is constituted by only a cylindrical reflection mirror, light is not, of course, incident perpendicularly on the reflection mirror if the axis of the cylinder is inclined with respect to the coordinate plane. Therefore, the reflected light beam passes in the different direction to that of the optical passage through which the incident light beam passes. As a result, the reflected light beam does not return to the distant light source. Therefore, if the axis of the cylinder is inclined, the conventional triangulation procedure used for coincident paths of the incident and reflected light beams cannot be used. However, according to this embodiment, even if the concentric axis is inclined, substantial problems do not occur so that the triangulation can be continued.

Then, derivation of coordinate data with the light reflection type cursor is conducted by using the thus obtained value L.

The above-described optical structures of the optical units are described only for the examples. They may be modified variously. Furthermore, the light reflection type cursor can be modified from the above-described embodiments. In addition, the movable structure of the movable optical portion can, of course, be modified variously.

According to this embodiment, the cursor is, as shown in FIG. 15(a), positioned on the input plate having a finite area. However, if the cursor is positioned within a region over which the laser beams can reach, it can be positioned on an optional level plane or vertical plane.

Although the object of the present invention is to enlarge the size of the apparatus, the present invention can, of course, be applied to the apparatus of the conventional size, for example, with paper sizes smaller than AO, as the scope of the claims of the present invention.

As described above, the optical recursively-reflecting coordinate input device according to the present invention is arranged such that the optical recursively-reflecting layer included thereon is formed on the cylindrical surface of the collimator. Therefore, the light beam incident on the cylindrical surface of the collimating member is reflected by the recursively reflecting layer prior to the beam reversely travelling the same optical path for the incidental light beam in a plan view toward the optical source. Therefore, the light beam can be used as an input indicator for a device for deriving the two-dimensional coordinates of the cursor by using triangulation principles and the laser optical energy.

The cursor according to the present invention can be also used with an optional board for deriving the coordinate information of the cursor. Furthermore, the coordinates over large regions can be determined, as long as the laser beams can be directed to that area.

Even if the cylindrical axis of the cursor is accidentally tilted during cursor movement, continuous tracking of the cursor position can be obtained by using triangulation principles because the reflected light beam travels reversely and parallel to the incident light beam. Furthermore the recursively reflecting layer can easily be formed by using inexpensive glass beads. Therefore, the overall cost, size and weight of the cursor are relatively small.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed. It is further understood by those skilled in the art that the foregoing description is preferred embodiment of the disclosed apparatus and that various changes and modifications may be made in the invention without departing from the spirit and scope thereof. For example, as disclosed in Japanese Patent Laid-Open No. 60-95644, the optical system and the coordinate detection plane are disposed perpendicularly to each other with respect to the mirror.

What is claimed:

1. An optical coordinate input apparatus comprising:
   a position indicator having a mirror portion with mirrored surfaces in planes perpendicular to plane XY over which the position indicator is movable, the mirrored surfaces being substantially equidistant from a central axis extending perpendicular to the plane XY;
   a light source for emitting laser beams;
   a first rotary mirror having a rotational axis perpendicular to the plane XY;
   a second rotary mirror disposed at a position removed from said first rotary mirror by a known distance and having a rotational axis perpendicular to the plane XY;
   an optical system for directing said laser beams emitted from said light source to be incident on said first rotary mirror and said second rotary mirror;
   a first photosensor for detecting said laser beam which is (a) incident on said first rotary mirror, (b) reflected by said first rotary mirror and a mirrored surface of said position indicator to traverse the same optical path as one of the laser beams incident on said mirrored surface, and (c) incident on said first rotary mirror before being reflected so as to be thus detected;
   a second photosensor for detecting said laser beam which is (a) incident on said second rotary mirror, (b) reflected by said second rotary mirror and a mirrored surface of said position indicator to traverse the same optical path as another of the laser beams incident on said mirrored surface, and (c) incident on said second rotary mirror before being reflected so as to be thus detected;
   angle detection means for detecting the rotational angles of said first rotary mirror and said second rotary mirror; and
   coordinate calculating means for calculating a coordinate of a central position of said mirrored surface of said position indicator in accordance with an output signal from said first photosensor, an output signal from said second photosensor, and in response to the detected angles and the known distance.

2. An optical coordinate input apparatus comprising:
   a position indicator having a mirror portion with mirrored surfaces in planes perpendicular to plane XY over which the position indicator is movable, the mirrored surfaces being substantially equidistant from a central axis extending perpendicular to the plane XY;
   a first rotary mirror having a rotational axis perpendicular to the plane XY;
   a second rotary mirror disposed at a position removed from said first rotary mirror by a known distance and having a rotational axis perpendicular to the plane XY;

a light source for emitting laser beams;

an optical system for directing said laser beams emitted from said light source to be incident on each of said first rotary mirror and said second rotary mirror from a plurality of directions;

a first group of plural photosensors positioned to correspond to angles of said plurality of directions for detecting one of said plural laser beams which is (a) incident on said first rotary mirror, (b) reflected by said first rotary mirror and a mirrored surface of said position indicator to traverse the same optical path as one of the laser beams incident on said mirrored surface and (c) incident on said first rotary mirror before being reflected so as to be thus detected;

a second group of plural photosensors positioned to correspond to angles of said plurality of directions for detecting one of said plural laser beams which is (a) incident on said second rotary mirror, (b) reflected by said second rotary mirror and a mirrored surface of said position indicator to traverse the same optical path as another of the laser beams incident on said mirrored surface, and (c) incident on said second rotary mirror before being reflected so as to be thus detected;

angle detection means for detecting the rotational angles of said first rotary mirror and said second rotary mirror; and coordinate calculating means for calculating a coordinate of a central position of said mirrored surface of said position indicator in accordance with an output signal from said first photosensor group, an output signal from said second photosensor group, and in response to the detected angles as well as the known distance.

3. An optical coordinate input apparatus according to claim 1, wherein said optical system comprises polarizing beam splitters each of which is disposed between said light source and said rotary mirrors and quarter wavelength plates each of which is disposed between said polarizing beam splitters and said rotary mirrors.

4. An optical coordinate input apparatus according to claim 1, wherein the optical path includes a cylindrical lens for causing a laser beam emitted from said light source to be in the form of a band, said lens being located in an optical path between said light source and said rotary mirror.

5. An optical coordinate input apparatus according to claim 1, wherein the optical path includes means for focusing said laser beam, said focusing means being located between said light source and said rotary mirror.

6. An optical coordinate input apparatus according to claim. 1, wherein said coordinate calculating means includes a coordinate calculation instruction signal generating circuit for generating a signal for instructing calculation of the coordinates, said coordinate calculation means calculating the coordinates in response to an output signal from said coordinate calculation instruction signal generating circuit.

7. A position indicator comprising a mirror portion with mirrored surfaces in planes perpendicular to plane XY over which the position indicator is movable, the mirrored surfaces being substantially equidistant from a central axis extending perpendicular to the plane XY and being on a body having a base with a planar surface that is movable over the plane XY, the central axis and the mirrored surfaces being at right angles to the planar surface of the base.

8. A position indicator according to claim 7, wherein said mirrored surface includes a sector of cylinder having an axis coincident with said central axis.

9. A position indicator according to claim 7, wherein said mirrored surface is convex.

10. A position indicator according to claim 7, wherein said mirrored surface is concave.

11. A position indicator according to claim 7 further comprising a pair of cross hairs having an intersection coincident with the central axis.

12. A position indicator for enabling the position of the indicator relative to a planar surface over which the indicator is moved to be optically determined comprising:

an annular optically transparent lens member having concentric inner and outer surfaces, said inner surface being a cylinder formed by rotating a straight line extending parallel to a concentric axis of the inner and outer surfaces about said concentric axis, said outer surface being a surface of revolution formed by rotating a convex line extending parallel to the concentric axis about said axis, said convex surface of revolution having a predetermined curvature to form a lens surface having an optical axis which extends along the radial direction of said annular shape, said lens having its focal point on said inner surface;

a reflection layer disposed on said inner surface of said annular lens member for reflecting light incident on a plane including said concentric axis and said radial optical axis, said reflected light being parallel to said incident light;

a support member for supporting said annular lens member and for enabling the lens member to be moved over said coordinate plane with said concentric axis retained perpendicular to a given coordinate plane; and a collimating member for enabling a central point through which said concentric axis of said annular lens member passes to be optically aligned with a specific point on said coordinate plane.

13. A position indicator according to claim 12, wherein said annular lens member has a ground surface and includes high refracting factor glass.

14. A position indicator according to claim 12, wherein said reflection layer includes a thin metal layer.

15. A position indicator according to claim 12, wherein said support member comprises a bottom portion which is slidably positioned with respect to said coordinate plane and a portion for fixing said annular lens member in such a manner that said concentric axis is perpendicular to said bottom portion.

16. A position indicator according to claim 12, wherein said collimating member comprises: (a) a fiber optic plate fastened to the inner portion of said annular lens member, and (b) a bottom portion slidably positioned with respect to said coordinate plane, an upper surface parallel to said bottom portion, and a parallel bundle of optical fibers for connecting said bottom portion and said upper surface.

17. Apparatus for determining the position of an object on a region of a planar surface, the region having an axis displaced from the periphery of the region, comprising:

means for deriving first and second scanned optical beams directed toward the axis from opposite sides thereof, the scanned beams being derived from first and second sites displaced from each other by a known distance along a base line, a retroreflector on the object, the scanned optical beams being incident on and reflected from the retroreflector so that the first and second beams are respectively reflected from the retroreflector along first and second paths that are coincident with paths from the sites from the retroreflector, optical detecting means responsive to optical energy reflected from the retroreflector and propagating along the first and second paths for deriving indications of first and second angles between the baseline and the first and second paths extending between the first and second sites and the retroreflector, and means responsive to the known distance and the derived indications of the first and second angles for deriving a two-coordinate direction indication of the retroreflector position.

18. The apparatus of claim 17 wherein the retroreflector includes means for refracting and reflecting the scanned optical beams incident thereon and for refracting the beams reflected thereby.

19. The apparatus of claim 18 the means for refracting and reflecting includes multiple refracting elements and a reflector element positioned behind the elements, the configuration and positioning of the elements being such that the optical beam refracted by the refracting elements is focused on the reflector element to be reflected back to the detecting means via the refracting elements.

20. The apparatus of claim 19 wherein the reflector element includes plural concave surfaces, one of said surfaces being provided for each of the refracting elements.

21. The apparatus of claim 19 wherein the refracting elements include spherical globules.

22. The apparatus of claim 17 wherein the means for refracting and reflecting includes multiple refracting elements configured so that the beams incident thereon are focused on a back surface of each element to be reflected from the back surface.

23. The apparatus of claim wherein the elements include spherical globules.

24. The apparatus of claim 22 wherein the elements include a fiber optic cable wound on a cylindrical surface.

25. The apparatus of claim 17 wherein the optical detecting means is responsive only to approximately the peak amplitude of the optical energy reflected from the retroreflector.

26. The apparatus of claim 17 wherein the retroreflector includes an arcuate reflecting surface coaxial with an axis substantially at right angles to the planar surface.

27. The apparatus of claim 26 wherein the arcuate surface is concave in planes substantially at right angles to the planar surface.

28. The apparatus of claim 26 wherein the arcuate surface is convex in planes substantially at right angles to the planar surface.

29. The apparatus of claim 26 wherein the arcuate surface is straight in planes substantially at right angles to the planar surface.

30. The apparatus of claim 29 wherein the reflecting surface is surrounded by a structure forming a lens for focusing optical energy in the paths on the reflecting surface.

31. The apparatus of claim 30 wherein the lens is a transparent structure having a relatively high index of refraction.

32. The apparatus of claim 26 wherein the object includes a pair of cross hair lines in a plane parallel to the planar surface and surrounded by the reflecting surface, the cross hair lines intersecting on the axis coaxial with the arcuate reflecting surface.

33. The apparatus of claim 17 wherein the optical detecting means includes first and second detectors respectively responsive to optical energy propagating away from the retroreflector along the first and second paths.

34. The apparatus of claim 17 further including means for varying the displacement of the sites relative to each other and for deriving a signal indicative of the distance between the sites along the baseline so that the signal has a value indicative of the known distance, the means for deriving a two-coordinate direction indication being responsive to the signal so that the derived position indication is controlled by the signal value indicative of the known distance.

35. The apparatus of claim 17 wherein the means for deriving the first and second scanned beams includes first and second reflectors, the first and second reflectors being turned on first and second axes extending at right angles to the planar surface at the first and second sites, respectively.

36. The apparatus of claim 35 wherein the means for deriving the first and second scanned beams includes means for directing plural optical beams toward the reflector at the first site from plural directions and for directing plural optical beams toward the reflector at the second site from plural directions, the reflectors at the first and second sites and the plural directions of the plural beams directed toward the first and second reflectors being arranged so that the first scanned beam is derived in response to only one of the plural beams directed toward the reflector at the first site and the second scanned beam is derived in response to only one of the plural beams directed toward the reflector at the second site.

37. The apparatus of claim 36 wherein the plural beams directed toward the first reflector propagate at right angles to each other and the plural beams directed toward the second reflector propagate along paths at right angles to each other.

38. The apparatus of claim 36 wherein four beams are directed from a source means for the beams toward the first reflector to propagate along paths at right angles to each other, and four beams are directed from a source means for the beams toward the second reflector to propagate along paths at right angles to each other.

39. The apparatus of claim 36 wherein the optical detecting means includes (a) plural detectors responsive to optical energy propagating away from the retroreflector via the first path and away from the first reflector via plural paths, one of which is associated with each of the plural optical beams directed toward the reflector at the first site, and (b) multiple detectors responsive to optical energy propagating away from the retroreflector via the second path and away from the second reflector via plural paths, one of which is associated with each of the plural optical beams directed toward the reflector at the second site.

40. The apparatus of claim 39 wherein the angle indication deriving means derives the indication for the first angle in response to the optical energy incident on only one of the plural detectors at a time and derives the indication for the second angle in response to the optical energy incident on only one of the multiple detectors at a time.

41. The apparatus of claim 35 wherein the optical detecting means includes (a) a first detector responsive to optical energy propagating away from the retroreflector along the first path and away from the first reflector, and (b) a second detector responsive to optical energy propagating away from the retroreflector along the second path and away from the second reflector.

42. The apparatus of claim 35 wherein the indications of the first and second angles are derived by detecting the relative time positions during rotation cycles of the first and second reflectors when optical energy reflected back to the first and second reflectors from the retroreflector has an amplitude in excess of a predetermined value.

43. The apparatus of claim 17 wherein the means for deriving the first beam includes a first polarizing beam splitter in a beam path between a source of the optical energy and a first reflector at the first site, the optical detecting means including a first detector in another beam path including the first beam splitter and first reflector, and the means for deriving the second beam includes a second polarizing beam splitter in a beam path between a source of the optical energy and a second reflector at the second site, the optical detecting means including a second detector in a further beam path including the second beam splitter and second reflector.

44. The apparatus of claim 43 further including first and second quarter wave length plates respectively in the beam paths between the first and second beam splitters and the first and second reflectors.

45. Apparatus for determining the position of an object on a region of a planar surface, the region having an axis displaced from the periphery of the region, comprising:
means for deriving first and second scanned optical beams directed toward the axis from opposite sides thereof, the scanned beams being derived from first and second sites displaced from each other by a known distance along a base line,
the scanned optical beams being incident on and reflected from the object so that the first and second beams are respectively reflected from the object along first and second paths that are coincident with paths from the sites toward the object,
optical detecting means responsive to optical energy reflected from the object and propagating along the first and second paths for deriving indications of first and second angles between the base line and the first and second paths extending between the first and second sites and the object,
means responsive to the known distance and the derived indications of the first and second angles for deriving a two-coordinate direction indication of the object position, and
means for varying the displacement of the sites relative to each other and for deriving a signal indicative of the distance between the sites along the baseline so that the signal has a value indicative of the known distance, the means for deriving a two-coordinate direction indication being responsive to the signal so that the derived position indication is controlled by the signal value indicative of the known distance.

46. The apparatus of claim 45 wherein the object includes a retroreflector on which the scanned optical beams are incident.

47. The apparatus of claim 45 wherein the means for deriving the first and second scanned beams includes first and second reflectors, the first and second reflectors being turned on first and second axes extending at right angles to the planar surface at the first and second sites, respectively.

48. The apparatus of claim 47 wherein the optical detecting means includes (a) a first detector responsive to optical energy propagating away from the retroreflector along the first path and away from the first reflector, and (b) a second detector responsive to optical energy propagating away from the retroreflector along the second path and away from the second reflector.

49. The apparatus of claim 47 wherein the indications of the first and second angles are derived by detecting the relative time positions during rotation cycles of the first and second reflectors when optical energy reflected back to the first and second reflectors from the retroreflector has an amplitude in excess of a predetermined value.

50. Apparatus for determining the position of an object on a region of a planar surface, the region having an axis displaced from the periphery of the region, comprising:
means for deriving first and second scanned optical beams directed toward the axis from opposite sides thereof, the scanned beams being derived from first and second sites displaced from each other by a known distance along a base line,
the scanned optical beams being incident on and reflected from the object so that the first and second beams are respectively reflected from the object along first and second paths that are coincident with paths from the sites toward the object,
optical detecting means responsive to optical energy reflected from the object and propagating along the first and second paths for deriving indications of first and second angles between the base line and the first and second paths extending between the first and second sites and the object,
means responsive to the known distance and the derived indications of the first and second angles for deriving a two-coordinate direction indication of the object position,
the means for deriving the first and second scanned beams including first and second reflectors, the first and second reflectors being turned on first and second axes extending at right angles to the planar surface at the first and second sites, respectively, and
means for directing plural optical beams toward the reflector at the first site from plural directions and for directing plural optical beams toward the reflector at the second site from plural directions, the reflectors at the first and second sites and the plural directions of the plural beams directed toward the first and second reflectors being arranged so that the first scanned beam is derived in response to only one of the plural beams directed toward the reflector at the first site and the second scanned beam is derived in response to only one of the plural beams directed toward the reflector at the second site.

51. The apparatus of claim 50 wherein the plural beams directed toward the first reflector propagate along paths at right angles to each other and the plural beams directed toward the second reflector propagate along paths at right angles to each other.

52. The apparatus of claim 51 wherein four beams are directed from a source means for the beams toward the first reflector to propagate along paths at right angles to each other, and four beams are directed from a source means for the beams toward the second reflector to propagate along paths at right angles to each other.

53. The apparatus of claim 51 wherein the optical detecting means includes (a) plural detectors responsive to optical energy propagating away from the retroreflector via the first path and away from the first reflector via plural paths, one of which is associated with each of the plural optical beams directed toward the reflector at the first site, and (b) multiple detectors responsive to optical energy propagating away from the retroreflector via the second path and away from the second reflector via plural paths, one of which is associated with each of the plural optical beams directed toward the reflector at the second site.

54. The apparatus of claim 53 wherein the angle indication deriving means derives the indication for the first angle in response to the optical energy incident on only one of the plural detectors at a time and derives the indication for the second angle in response to the optical energy incident on only one of the multiple detectors at a time.

55. The apparatus of claim 50 wherein the object includes a retroreflector on which the scanned optical beams are incident.

56. The apparatus of claim 50 wherein the indications of the first and second angles are derived by detecting the relative time positions during rotation cycles of the first and second reflectors when optical energy reflected back to the first and second reflectors from the retroreflector has an amplitude in excess of a predetermined value.

57. Apparatus for determining the position of an object on a region of a planar surface, the region having an axis displaced from the periphery of the region, comprising:
means for deriving first and second scanned optical beams directed toward the axis from opposite sides thereof, the scanned beams being derived from first and second sites displaced from each other by a known distance along a base line,
the scanned optical beams being incident on and reflected from the object so that the first and second beams are respectively reflected from the object along first and second paths that are coincident with paths from the sites toward the object,
optical detecting means responsive to optical energy reflected from the object and propagating along the first and second paths for deriving indications of first and second angles between the base line and the first and second paths extending between the first and second sites and the object,
means responsive to the known distance and the derived indications of the first and second angles for deriving a two-coordinate direction indication of the object position,
the means for deriving the first beam including a first polarizing beam splitter in a beam path between a source of the optical energy and a first reflector at the first site,
the optical detecting means including a first detector in another beam path including the first beam splitter and first reflector,
the means for deriving the second beam including a second polarizing beam splitter in a beam path between a source of the optical energy and a second reflector at the second site, and
the optical detecting means includes a second detector in a further beam path including the second beam splitter and second reflector.

58. The apparatus of claim 57 further including first and second quarter wave length plates respectively in the beam paths between the first and second beam splitters and the first and second reflectors.

59. The apparatus of claim 57 wherein the object includes a retroreflector on which the scanned optical beams are incident.

60. The apparatus of claim 57 wherein the means for deriving the first and second scanned beams includes first and second reflectors, the first and second reflectors being turned on first and second axes extending at right angles to the planar surface at the first and second sites, respectively.

61. The apparatus of claim 60 wherein the indications of the first and second angles are derived by detecting the relative time positions during rotation cycles of the first and second reflectors when optical energy reflected back to the first and second reflectors from the retroreflector has an amplitude in excess of a predetermined value.

62. An implement movable over a planar surface and including structure for enabling the position of the implement to be determined optically in response to optical energy beams propagating parallel to the planar surface, the implement having an axis substantially perpendicular to the plane while the implement is moved over the plane, the implement comprising a planar face movable over the plane, an arcuate reflecting surface that moves with the planar face and is coaxial with and extends in the direction of the axis so that the propagating optical energy beams are incident thereon, and a structure forming a lens surrounding the arcuate reflecting surface forming a lens for focusing the optical energy beams propagating parallel to the planar surface on the reflecting surface.

63. The implement of claim 62 wherein the structure includes an exterior wall concentric with and extending in the direction of the axis, the optical energy beams being incident on the exterior wall prior to propagating to the reflecting surface.

64. The implement of claim 63 wherein the wall has a convex shape for focusing the optical energy propagating in the beams on the reflecting surface.

65. The implement of claim 64 wherein the lens has an index of refraction substantially in excess of unity.

66. The implement of claim 64 wherein the exterior wall and the reflecting surfaces are, in cross sections at right angles to the axis, sectors of circles having coincident centers on the axis.

67. The implement of claim 62 further including a reticle having a center coincident with the axis.

68. The implement of claim 67 further including a bundle of fiber optic elements extending in the direction of the axis between a top and bottom face of the implement and inside of the reflecting surface, the fiber optic elements optically coupling an image of the reticle to the top face so the image can be viewed by a user of the implement.

69. The position indicator of claim 8 wherein said sector has an extent of at least 180°.

70. Apparatus for determining the position of an object on a region of a planar surface, the region having an axis displaced from the periphery of the region, comprising:

means for deriving first and second scanned optical beams directed toward the axis from opposite sides thereof, the scanned beams being derived from first and second sites displaced from each other by a known distance along a base line, the scanned optical beams being incident on and reflected from the object so that the first and second beams are respectively reflected from the object along first and second paths that are coincident with paths from the sites toward the object, optical detecting means responsive only to approximately the peak amplitude optical energy reflected from the object and propagating along the first and second paths for deriving indications of first and second angles between the baseline and the first and second paths extending between the first and second sites and the object, and means responsive to the known distance and the derived indications of the first and second angles for deriving a two-coordinate direction indication of the object position.

71. An optical coordinate input apparatus comprising means forming a first planar surface on which the position of an object is to be optically detected;

the object including: a base having a second planar surface that is movable over the first planar surface, mirrored surfaces substantially at right angles to the second planar surfaces and substantially equidistant from a central axis extending at right angles to the second planar surface;

an optical source for directing optical energy at the mirrored surfaces;

and means responsive to optical energy of the source incident on and reflected from the mirrored surfaces for indicating the location of the object on the first planar surface.

72. The apparatus of claim 71 wherein said mirrored surface includes a sector of a cylinder having an axis coincident with said central axis.

73. The apparatus of claim 71 wherein said mirrored surface is convex.

74. The apparatus of claim 71 wherein said mirrored surface is concave.

75. The apparatus of claim 71 wherein the object includes a pair of cross hairs having an intersection coincident with the central axis.

* * * * *